US012645263B2

(12) United States Patent
Leong et al.

(10) Patent No.: US 12,645,263 B2
(45) Date of Patent: Jun. 2, 2026

(54) DISPLAY ASSISTANT DEVICE

(71) Applicant: Google LLC, Mountain View, CA (US)

(72) Inventors: Justin Leong, Milpitas, CA (US);
Xiaoping Qin, San Jose, CA (US);
Christen Cameron Bilger, Sunnyvale,
CA (US); Philip Hobson Boothby,
Scotts Valley, CA (US); Frances Kwee,
Redwood City, CA (US); **Matthew
Michael Seflic**, San Jose, CA (US);
James Castro, San Jose, CA (US)

(73) Assignee: Google LLC, Mountain View, CA (US)

( * ) Notice: Subject to any disclaimer, the term of this
patent is extended or adjusted under 35
U.S.C. 154(b) by 401 days.

(21) Appl. No.: 18/502,854

(22) Filed: Nov. 6, 2023

(65) Prior Publication Data

US 2024/0160251 A1 May 16, 2024

Related U.S. Application Data

(63) Continuation of application No. 16/525,360, filed on
Jul. 29, 2019, now Pat. No. 11,836,009, which is a
(Continued)

(51) Int. Cl.
G06F 1/16 (2006.01)
G02F 1/1333 (2006.01)
(Continued)

(52) U.S. Cl.
CPC ........ G06F 1/166 (2013.01); G02F 1/133308
(2013.01); G02F 1/133753 (2013.01);
(Continued)

(58) Field of Classification Search
CPC ...... G06F 1/166; G06F 1/1605; G06F 1/1626;
G06F 1/1637; G06F 1/1658;
(Continued)

(56) References Cited

U.S. PATENT DOCUMENTS 6,411,271 B1 * 6/2002 Bang ..................... G06F 1/1601
248/920
D563,405 S * 3/2008 Taniho ......................... D14/336
(Continued)

FOREIGN PATENT DOCUMENTS

CN 102956153 A 3/2013
CN 205864958 U 1/2017
(Continued)

OTHER PUBLICATIONS

"Linky: Touchscreen Smart Hub with Google Assistant," Indiegogo,
Jul. 16, 2024, 5 pages. Retrieved from https://www.indiegogo.com/
projects/lynky-touchscreen-smart-hub-with-google-assistant#/.

*Primary Examiner* — Abhishek M Rathod
(74) *Attorney, Agent, or Firm* — Lerner David LLP

(57) ABSTRACT

This application is directed to a display assistant device that
acts as a voice-activated user interface device. The display
assistant device includes a base, a screen and a rear speaker.
The base is configured for sitting on a surface. The screen
has a rear surface and is supported by the base at the rear
surface. A bottom edge of the screen is configured to be held
above the surface by a predefined height, and the base is
substantially hidden behind the screen from a front view of
the display assistant device. The rear speaker is concealed
inside the base and oriented to project sound towards the rear
side of the base.

19 Claims, 17 Drawing Sheets

Related U.S. Application Data continuation of application No. PCT/US2019/028601, filed on Apr. 23, 2019, which is a continuation of application No. PCT/US2018/064536, filed on Dec. 7, 2018, and a continuation of application No. PCT/US2018/064452, filed on Dec. 7, 2018, and a continuation of application No. PCT/US2018/064449, filed on Dec. 7, 2018.

(60) Provisional application No. 62/743,464, filed on Oct. 9, 2018, provisional application No. 62/742,892, filed on Oct. 8, 2018, provisional application No. 62/742,888, filed on Oct. 8, 2018.

(51) Int. Cl.

| | |
|---|---|
| *G02F 1/1337* | (2006.01) |
| *G06F 3/16* | (2006.01) |
| *G06F 21/83* | (2013.01) |
| *G10L 15/28* | (2013.01) |
| *H04R 1/02* | (2006.01) |
| *H04R 1/34* | (2006.01) |
| *H04L 12/28* | (2006.01) |

(52) U.S. Cl.

CPC .......... *G06F 1/1605* (2013.01); *G06F 1/1626* (2013.01); *G06F 1/1637* (2013.01); *G06F 1/1658* (2013.01); *G06F 1/1683* (2013.01); *G06F 1/1686* (2013.01); *G06F 1/1688* (2013.01); *G06F 1/1698* (2013.01); *G06F 3/167* (2013.01); *G06F 21/83* (2013.01); *G10L 15/28* (2013.01); *H04R 1/023* (2013.01); *H04R 1/025* (2013.01); *H04R 1/028* (2013.01); *H04R 1/345* (2013.01); *G02F 1/133325* (2021.01); *G02F 1/133761* (2021.01); *H04L 12/282* (2013.01); *H04R 2499/15* (2013.01)

(58) Field of Classification Search

CPC .... G06F 1/1683; G06F 1/1686; G06F 1/1688; G06F 1/1698; G06F 1/203; G06F 1/16; G06F 1/1671; G06F 1/1656

See application file for complete search history.

(56) References Cited

U.S. PATENT DOCUMENTS

| | | | | |
|---|---|---|---|---|
| D598,372 | S | * | 8/2009 | Sasada .......................... D13/102 |
| D611,032 | S | * | 3/2010 | Kim .............................. D14/188 |
| D720,393 | S | * | 12/2014 | Held .............................. D18/4.4 |
| D789,362 | S | * | 6/2017 | Eljas ............................ D14/336 |
| D811,383 | S | * | 2/2018 | Diasabeygunawardena ................ D14/336 |
| D830,868 | S | * | 10/2018 | Kress ............................ D10/49 |
| 10,304,450 | B2 | | 5/2019 | Tak et al. |
| 10,484,770 | B1 | * | 11/2019 | Rao .......................... H04R 1/04 |
| 10,687,184 | B2 | | 6/2020 | Silverstein et al. |
| 10,957,171 | B2 | | 3/2021 | Heitz, III et al. |
| 2007/0146558 | A1 | | 6/2007 | Urisu |
| 2011/0248828 | A1 | | 10/2011 | Margalef et al. |
| 2013/0058023 | A1 | * | 3/2013 | Supran ..................... H05K 7/00 361/679.01 |
| 2014/0022749 | A1 | | 1/2014 | Nonomura et al. |
| 2015/0053497 | A1 | * | 2/2015 | Horiuchi ................ H04N 5/642 181/199 |
| 2016/0197411 | A1 | | 7/2016 | Subbaraman et al. |
| 2017/0111077 | A1 | | 4/2017 | Hwang et al. |
| 2017/0278361 | A1 | * | 9/2017 | Fujimoto ................. G07G 1/12 |
| 2018/0199123 | A1 | * | 7/2018 | Rao ......................... G06F 1/203 |
| 2019/0148816 | A1 | | 5/2019 | Chen et al. |

FOREIGN PATENT DOCUMENTS

| | | |
|---|---|---|
| CN | 109398251 A | 3/2019 |
| WO | 2020060577 A1 | 3/2020 |
| WO | 2020076351 A1 | 4/2020 |
| WO | 2020076352 A1 | 4/2020 |
| WO | 2020076364 A1 | 4/2020 |

* cited by examiner

Display Assistant Device 300

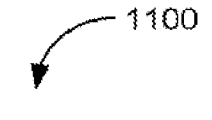

1100

Provide a display front, a middle frame and a base 1102

> Couple a cover glass to a display panel to cover the display panel 1104A

> Dispose a display module on a rear surface of the display panel 1104B

> Attach a thermal spreader the rear surface of the display panel to at least partially distribute heat on the rear surface of the display panel 1104C > Forming a speaker assembly 1106

> Dispose a speaker assembly and a power management unit in a house 1108A

> Covere the house with a base mount plate 1108B

Assemble a back cover to the base 1110

Couple the middle frame to the back cover via a plurality of first retention elements on the rear surface of the middle frame and a plurality of second retention elements on a front surface of the back cover 1112

Couple the display front to the middle frame 1114

Figure 11

DISPLAY ASSISTANT DEVICE

CROSS-REFERENCES TO RELATED APPLICATIONS

This application claims priority to and is a continuation application of U.S. patent application Ser. No. 16/525,360, filed Jul. 29, 2019, titled "Display Assistant Device" which is a continuation of International Application No. PCT/US2019/28601, filed Apr. 23, 2019, titled "Display Assistant Device," which claims priority to the following patent applications:

U.S. Provisional Patent Application No. 62/742,892, filed Oct. 8, 2018, titled "Display Assistant Device";

U.S. Provisional Patent Application No. 62/742,888, filed Oct. 8, 2018, titled "Drop Protection for Display Assistant Device";

U.S. Provisional Patent Application No. 62/743,464, filed Oct. 9, 2018, titled "Speaker Assembly in a Display Assistant Device";

International Application No. PCT/US2018/064449, filed Dec. 7, 2018, titled "Display Assistant Device";

International Application No. PCT/US2018/064452, filed Dec. 7, 2018, titled "Drop Protection for Display Assistant Device"; and International Application No. PCT/US2018/064536, filed Dec. 7, 2018, titled "Speaker Assembly in a Display Assistant Device".

Each of the above-referenced applications is herein incorporated by reference in its entirety.

This application is related to International Application No. PCT/US2019/28959, filed Apr. 24, 2019, titled "Multi-purpose Speaker Enclosure in a Display Assistant Device," which is herein incorporated by reference in its entirety.

TECHNICAL FIELD

This application relates generally to electronic devices, including but not limited to a voice-activated display assistant device that is used as a user interface device in a smart home environment.

BACKGROUND OF THE INVENTION

Electronic devices integrated with microphones have been widely used to collect voice inputs from users and implement different voice-activated functions according to the voice inputs. For example, many state-of-the-art mobile devices include a voice assistant system (e.g., Siri and Google Assistant) that is configured to use voice inputs to initiate a phone call, conduct a restaurant search, start routing on a map, create calendar events, add a post to a social network, recognize a song and complete many other tasks. These mobile devices include complicated operating systems that implement tasks initiated by the voice inputs but do not constantly detect the voice inputs from their surroundings. A voice interface function has to be activated via the operating systems to make the mobile devices listen to the voice inputs. On the other hand, when an electronic device having a relatively simple structure and made at a low cost is applied to implement similar voice activated functions as the mobile devices, the electronic device is often-times simplified to a combination of a microphone and a speaker, eliminating the benefits offered by use of a display screen.

In addition, the voice activated functions currently implemented in many electronic devices are limited to Internet-based functions that involve remote servers (e.g., a search engine, a social network server or a voice assistant server). The results of the voice activated functions are used to control the electronic devices themselves, and do not impact any other remote or local electronic devices accessible to the user. Given that voice inputs are convenient for the user, it is beneficial to allow the user to use voice inputs to control other electronic devices accessible to the user in addition to requesting the Internet-based functions limited between the remote servers and the electronic devices themselves.

BRIEF SUMMARY OF THE INVENTION

Accordingly, an electronic device is applied in a smart home environment to provide an eyes-free and hands-free voice interface that can activate voice-activated functions to control media devices or smart home devices in the smart home environment. The electronic device is configured to sit at a fixed location in the smart home environment, and at least includes a display screen in addition to a microphone and a speaker. The electronic device does not include a complicated operating system, but provides a low cost user interface solution dedicated to constantly listening to its surroundings, collecting audio inputs, and presenting both audio and video information in response to the audio inputs. Further, in some implementations, the audio inputs are collected from the surroundings to initiate voice-activated functions on other media play devices or smart home devices coupled within the smart home environment. Examples of these voice-activated functions include, but are not limited to, initiating play of media content, transferring media content among different media devices, reviewing smart device readings and statuses, powering on or off a smart device, and controlling smart device settings.

In accordance with one aspect of this application, a display assistant device includes a base, a screen and a rear speaker. The base is configured for sitting on a surface and has a front side and a rear side that is taller than the front side. The screen has a rear surface and is supported by the front and rear sides of the base at the rear surface. The base is substantially hidden behind the screen from a front view of the display assistant device. The rear speaker is concealed inside the base and configured to project sound out of the base substantially via the rear side of the base. That said, in some implementations, the rear speaker is oriented to project the sound towards the rear side of the base. The rear speaker has a rear speaker opening that faces the rear side of the base, and projects sound directly out of at least a threshold portion (e.g., 60%) of an area of the rear side of the base. The rear speaker may project out a large portion (e.g., >90%) of sound volume via the rear side of the base. Additionally, in some implementations, the display assistant device further includes one or more (e.g., 2) front speakers that are concealed inside the base, face a front view of the display assistant device (i.e., is oriented to project sound towards the front side of the base), and are configured to project sound out of the base substantially via the front side of the base. In an example, the rear speaker is a woofer speaker, and the one or more front speakers includes two tweeter speakers configured to produce higher audio frequencies than those produced by the woofer speaker.

In accordance with various embodiments of this application, the display assistant device has a substantially small footprint that allows the display assistant device to be conveniently disposed at many different locations (e.g., a kitchen, living room and bedroom) in the smart home environment. Despite the substantially small footprint, the speaker has a relatively heavy weight and is configured to pull a center of mass of the display assistant device close to the surface on which the display assistant device sits. A low center of mass allows the display assistant device to maintain stability at them time of being touched or hit. The display assistant device further includes many mechanical features configured to protect the screen of the display assistant from falling apart from the base and being damaged when the display assistant device hits a floor. By these means, this application provides a low-cost, mechanically robust, and voice-activated user interface solution that has visual display capabilities and supports various voice-activated functions.

In various implementations of this application, the display assistant device also delivers a home monitoring service in addition to its core consumption uses for entertainment, family connection, and productivity. The display assistant device includes a built-in camera that is configured to allow users to keep track of what is happening at home, thus providing users with peace of mind. The display assistant device further includes affordances that identify its operation mode to users (e.g., account owners, family members, and visitors) as they interact with the device.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 11 is a flow chart of an example assembly process of a display assistant device 500 in accordance with some implementations.

Like reference numerals refer to corresponding parts throughout the several views of the drawings.

DESCRIPTION OF IMPLEMENTATIONS

Figure 1:
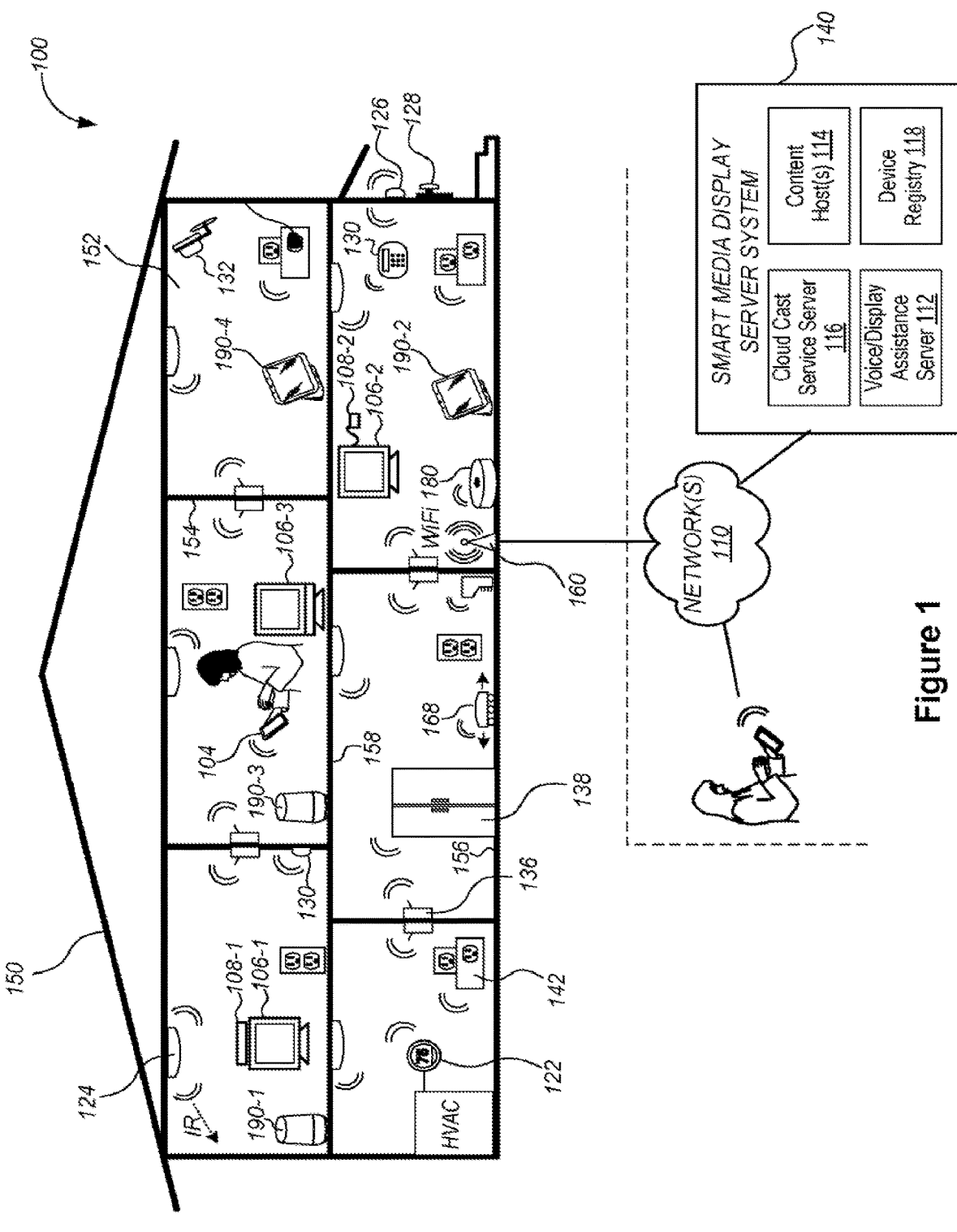
FIG. 1 is an example smart home environment in accordance with some implementations.

While digital revolution has provided many benefits ranging from openly sharing information to a sense of global community, emerging new technology often induces confusion, skepticism and fear among consumers, preventing consumers from benefitting from the technology. Electronic devices are conveniently used as voice interfaces to receive voice inputs from users and initiate voice-activated functions, and thereby offer eyes-free and hands-free solutions to approach both existing and emerging technology. Specifically, the voice inputs received at an electronic device can carry instructions and information even if a user's line of sight is obscured and his hands are full. To enable hands-free and eyes-free experience, the voice-activated electronic device listens to the ambient (i.e., processes audio signals collected from the ambient) constantly or only when triggered. On the other hand, user identities are linked with a user's voice and a language used by the user. To protect the user identities, voice-activated electronic devices are normally used in non-public places that are protected, controlled and intimate spaces (e.g., home and car).

In accordance with some implementations of the invention, a voice-activated electronic device includes a screen configured to provide additional visual information in addition to audio information that can be broadcast via a speaker of the voice-activated electronic device. For example, the electronic device displays caller information (e.g., a caller's name and number) on the screen in response to receiving a voice command to initiate a phone call. The electronic device may play a YouTube video clip on the screen in response to receiving a voice command including identification information of the video clip. The electronic device may display a list of restaurants and their contact information in response to receiving a voice command for conducting a restaurant search. The electronic device may display a map and a suggested route in response to receiving a voice command to identify a route to a destination on a map. The electronic device may display event information of an upcoming event in response to receiving a voice command to review calendar events. The electronic device may display a post that is transcribed from a voice message in response to receiving a voice command to add a post to a social network. The electronic device may display information of a song that is currently being played (e.g., a title, composer and singer of the song, a YouTube link) in response to receiving a voice command to recognize the song.

Specifically, the voice-activated electronic device, when integrated with its own display screen, constitutes a display assistant device. The display assistant device thereby includes a base, a screen and a speaker. The base is configured for sitting on a surface, and has a front side and rear side that is taller than the front side. The screen has a rear surface and is supported by the front and rear sides of the base at its rear surface. The speaker is concealed inside the base and configured to project sound substantially towards the rear side of the base. A bottom edge of the screen is configured to be held above the surface by a predefined height, and the base is substantially hidden behind the screen from a front view of the display assistant device (i.e., the base appears to float in air from the front view). The display assistant device has a substantially small footprint, and however, a center of mass of the display assistant device is configured to be close to the surface on which the display assistant device sits, thereby allowing the display assistant device to maintain stability at a time of being touched or hit. That said, the display assistant device provides a low-cost, mechanically robust, and voice-activated user interface solution that has visual display capabilities and supports various voice-activated functions.

In various implementations of this application, display assistant devices integrated with microphones and cameras can be used to collect audio and visual inputs from users and implement voice-activated functions according to voice inputs. Some electronic devices include a voice assistant feature that is configured to use audio inputs to perform many tasks. The functionality of these display assistant devices can be further expanded to home security and remote monitoring, to provide peace of mind to users.

For example, consider a use case in which a first user purchases a voice-activated display assistant device with video monitoring capabilities. While commissioning (e.g., provisioning) the display assistant device for use in her smart home environment (e.g., using a smart home application installed on her mobile device), the first user receives a welcome message on the smart home application asking if she would like to configure the display assistant device for smart home monitoring. The first user accepts the offer and completes the provisioning process, during which the display assistant device is configured to perform video and audio monitoring functions in addition to a range of voice and display assistant functions. Thereafter, the first user is able to move about the room where the display assistant device is located while issuing multiple verbal requests to the display assistant device. The assistant device receives the verbal requests and presents responses, which include visual and/or audio information for the first user to view and/or listen to. Later, when the first user is at work, having configured the display assistant device for smart home monitoring, she is able to see a live video steam of the room, captured using the camera of the display assistant device, using her smart home application. The first user is also able to receive notifications alerting her to unusual activity or unfamiliar faces in the room captured by the camera and/or microphones of the display assistant device. In response to the notifications, the first user is able to check out a live view of the room and respond accordingly via her smart home application.

The use case described above mentions particular modalities through which the first user interacts with the display assistant device (e.g., voice inputs, or inputs received from a smart home application) and receives information from the display assistant device (e.g., information presented via the smart home application or via audio or video playback from the display assistant device). However, in some implementations the display assistant device is responsive to a wider range of inputs, including one or more of: voice inputs, inputs received from a smart home application, touch inputs entered on a touch sensitive display of the display assistant device, and/or air gestures performed in proximity to the display assistant device that are captured by its camera or a sensor included in the display assistant device, such as a radar transceiver or PIR detector.

In some implementations, a user is provided with various subscription options when provisioning the display assistant device. The subscription options include a first option (e.g., a free tier or a lower cost tier) that provides one or more of: a "Live View" capability (e.g., the ability to review via a smart home app or browser, in at least near real time, video from the camera); a "Talk & Listen" capability (e.g., the ability to speak and listen via a smart home app or browser, in real time, to an individual in proximity to the display assistant device); basic event notifications (e.g., notifications for motion events and/or sound events and/or person events captured by the camera and/or microphone of the display assistant device); a display assistant device camera history (e.g., a one-hour, three-hour, or five-hour history of camera recordings); and monitoring settings including a Home/Away Assist setting (e.g., a setting in which the display assistant device is configured to turn on its camera and enter monitoring mode when the user is "away" and to turn off its camera and exit monitoring mode when the user is "home") and Camera Scheduling (a setting in which the user is able to define a schedule for turning the camera and monitoring mode on and off). Further details regarding Live View and Talk & Listen operations are described below in the section entitled "Device Operation Modes." In some implementations, the subscription options include a second option (e.g., a paid tier or a higher cost tier) that includes all the features of the first option and additional features. In some implementations, the additional features included in second option include intelligent event notifications, such as Familiar Face, Activity Zone, Dog Barking, Person Talking, Broken Glass and Baby Crying alerts; Continuous Video History; Time Lapse Video Summaries; and/or Close-Up Tracking Views of events of interest. Details of intelligent event notifications are described in U.S. patent application Ser. No. 15/207,458, filed Jul. 11, 2016, titled "Methods and Systems for Providing Event Alerts," which is incorporated by reference herein in its entirety.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 1 is an example smart home environment 100 in accordance with some implementations. The smart home environment 100 includes a structure 150 (e.g., a house, office building, garage, or mobile home) with various integrated devices (also referred to herein as "connected" or "smart" devices). It will be appreciated that smart devices may also be integrated into a smart home environment 100 that does not include an entire structure 150, such as an apartment, condominium, or office space. In some implementations, the smart devices include one or more of: personal client devices 104 (e.g., tablets, laptops or mobile phones), display devices 106, media casting or streaming devices 108, thermostats 122, home protection devices 124 (e.g., smoke, fire and carbon dioxide detector), home security devices (e.g., motion detectors, window and door sensors and alarms), including connected doorbell/cameras 126, connected locksets 128, alarm systems 130 and cameras 132, connected wall switches transponders 136, connected appliances 138, WiFi communication devices 160 (e.g., hubs, routers, extenders), connected home cleaning devices 168(e.g., vacuum or floor cleaner), smart home communication and control hubs 180, voice assistant devices 192, and display assistant devices 190.

It is to be appreciated that the term "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, yards, parks, and more generally any living space or work space.

It is also to be appreciated that while the terms user, customer, installer, homeowner, occupant, guest, tenant, landlord, repair person, and the like may be used to refer to a person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158.

One or more media devices are disposed in the smart home environment 100 to provide users with access to media content that is stored locally or streamed from a remote content source (e.g., content host(s) 114). In some implementations, the media devices include media output devices 106, which directly output/display/play media content to an audience, and cast devices 108, which stream media content received over one or more networks to the media output devices 106. Examples of the media output devices 106 include, but are not limited to, television (TV) display devices, music players and computer monitors. Examples of the cast devices 108 include, but are not limited to, medial streaming boxes, casting devices (e.g., GOOGLE CHROMECAST devices), set-top boxes (STBs), DVD players and TV boxes.

In the example smart home environment 100, media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-3 includes a smart TV device that integrates an embedded casting unit to stream media content for display to its audience. The media output device 106-2 includes a regular TV display that is coupled to a TV box 108-1 (e.g., Google TV or Apple TV products), and such a TV box 108-2 streams media content received from a media content host server 114 and provides an access to the Internet for displaying Internet-based content on the media output device 106-2.

In addition to the media devices 106 and 108, one or more electronic devices 190 and 192 are disposed in the smart home environment 100. Electronic devices 190 are display assistant devices and electronic devices 192 are voice assistant devices. In some implementations, the display assistant device 190 is also a voice assistant device. The electronic devices 190 and 192 collect audio inputs for initiating various media play functions of the devices 190 and 192 and/or media devices 106 and 108. In some implementations, the devices 190 and 192 are configured to provide media content that is stored locally or streamed from a remote content source. In some implementations, the electronic devices 190 and 192 are voice-activated and are disposed in proximity to a media device, for example, in the same room with the cast devices 108 and the media output devices 106. Alternatively, in some implementations, a voice-activated display assistant device 190-1 is disposed in a room having one or more smart home devices but not any media device. Alternatively, in some implementations, a voice-activated electronic device 190 is disposed in a location having no networked electronic device. This allows for the devices 190 and 192 to communicate with the media devices and share content that is being displayed on one device to another device (e.g., from device 190-1 to device 190-2 and/or media devices 108).

The voice-activated electronic device 190 includes at least one microphone, a speaker, a processor and memory storing at least one program for execution by the processor. The speaker is configured to allow the electronic device 190 to deliver voice messages to a location where the electronic device 190 is located in the smart home environment 100, thereby broadcasting information related to a current media content being displayed, reporting a state of audio input processing, having a conversation with or giving instructions to a user of the electronic device 190. For instance, in some embodiments, in response to a user query the device provides audible information to the user through the speaker. As an alternative to the voice messages, visual signals could also be used to provide feedback to the user of the electronic device 190 concerning the state of audio input processing, such as a notification displayed on the device.

In accordance with some implementations, an electronic device 190 is a voice interface device that is network-connected to provide voice recognition functions with the aid of a server system 140. In some implementations, the server system 140 includes a cloud cast service server 116 and/or a voice/display assistance server 112. For example, in some implementations an electronic device 190 includes a smart speaker that provides music (e.g., audio for video content being displayed on the device 190 or on a display device 106) to a user and allows eyes-free and hands-free access to a voice assistant service (e.g., Google Assistant). Optionally, the electronic device 190 is a simple and low cost voice interface device, e.g., a speaker device and a display assistant device (including a display screen having no touch detection capability).

In some implementations, the voice-activated electronic devices 190 integrates a display screen in addition to the microphones, speaker, processor and memory (e.g., 190-2 and 190-4), and are referred to as "display assistant devices." The display screen is configured to provide additional visual information (e.g., media content, information pertaining to media content, etc.) in addition to audio information that can be broadcast via the speaker of the voice-activated electronic device 190. When a user is nearby and his or her line of sight is not obscured, the user may review the additional visual information directly on the display screen of the display assistant device. Optionally, the additional visual information provides feedback to the user of the electronic device 190 concerning the state of audio input processing. Optionally, the additional visual information is provided in response to the user's previous voice inputs (e.g., user queries), and may be related to the audio information broadcast by the speaker. In some implementations, the display screen of the voice-activated electronic devices 190 includes a touch display screen configured to detect touch inputs on its surface (e.g., instructions provided through the touch display screen). Alternatively, in some implementations, the display screen of the voice-activated electronic devices 190 is not a touch display screen, which is relatively expensive and can compromise the goal of offering the display assistant device 190 as a low cost user interface solution.

When voice inputs from the electronic device 190 are used to control the electronic device 190 and/or media output devices 106 via the cast devices 108, the electronic device 190 effectively enables a new level of control of cast-enabled media devices independently of whether the electronic device 190 has its own display. In an example, the electronic device 190 includes a casual enjoyment speaker with far-field voice access and functions as a voice interface device for Google Assistant. The electronic device 190 could be disposed in any room in the smart home environment 100. When multiple electronic devices 190 are distributed in multiple rooms, they become audio receivers that are synchronized to provide voice inputs from all these rooms. For instant, a first electronic device 190 may receive a user instruction that is directed towards a second electronic device 190-2 (e.g., a user instruction of "OK Google, show this photo album on the Kitchen device.").

Specifically, in some implementations, an electronic device 190 includes a WiFi speaker with a microphone that is connected to a voice-activated personal assistant service (e.g., Google Assistant). A user could issue a media play request via the microphone of electronic device 190, and ask the personal assistant service to play media content on the electronic device 190 itself and/or on another connected media output device 106. For example, the user could issue a media play request by saying to the Wi-Fi speaker "OK Google, Play cat videos on my Living room TV." The personal assistant service then fulfils the media play request by playing the requested media content on the requested device using a default or designated media application.

A user could also make a voice request via the microphone of the electronic device 190 concerning the media content that has already been played and/or is being played on a display device. For instance, a user may instruct the device to provide information related to a current media content being displayed, such as ownership information or subject matter of the media content. In some implementations, closed captions of the currently displayed media content are initiated or deactivated on the display device by voice when there is no remote control or a second screen device is available to the user. Thus, the user can turn on the closed captions on a display device via an eyes-free and hands-free voice-activated electronic device 190 without involving any other device having a physical user interface, and such a voice-activated electronic device 190 satisfies federal accessibility requirements for users having hearing disability. In some implementations, a user wants to take a current media session with them as they move through the house. This requires the personal assistant service to transfer the current media session from a first cast device to a second cast device that is not directly connected to the first cast device or has no knowledge of the existence of the first cast device. Subsequent to the media content transfer, a second output device 106 coupled to the second cast device 108 continues to play the media content previously a first output device 106 coupled to the first cast device 108 from the exact point within a photo album or a video clip where play of the media content was forgone on the first output device 106.

In some implementations, the display assistant device includes a display screen and one-or more built in cameras (e.g., 190-4). The cameras are configured to capture images and/or videos, which are then transmitted (e.g., streamed) to a server system 140 for display on client devices(s) (e.g., authorized client devices 104 and 220, FIG. 2C).

In some implementations, the voice-activated electronic devices 190, smart home devices could also be mounted on, integrated with and/or supported by a wall 154, floor 156 or ceiling 158 of the smart home environment 100 (which is also broadly called as a smart home environment in view of the existence of the smart home devices). The integrated smart home devices include intelligent, multi-sensing, network-connected devices that integrate seamlessly with each other in a smart home network (e.g., 102 FIG. 1B) and/or with a central server or a cloud-computing system to provide a variety of useful smart home functions. In some implementations, a smart home device is disposed at the same location of the smart home environment 100 as a cast device 108 and/or an output device 106, and therefore, is located in proximity to or with a known distance with respect to the cast device 108 and the output device 106.

In some implementations, the smart home devices in the smart home environment 100 includes, but is not limited to, one or more intelligent, multi-sensing, network-connected camera systems 132. In some embodiments, content that is captured by the camera systems 132 is displayed on the electronic devices 190 at a request of a user (e.g., a user instruction of "OK Google, Show the baby room monitor.") and/or according to settings of the home environment 100 (e.g., a setting to display content captured by the camera systems during the evening or in response to detecting an intruder).

The smart home devices in the smart home environment 100 may include, but are not limited to, one or more intelligent, multi-sensing, network-connected thermostats 122, one or more intelligent, network-connected, multi-sensing hazard detectors 124, one or more intelligent, multi-sensing, network-connected entryway interface devices 126 and 128 (hereinafter referred to as "smart doorbells 126" and "smart door locks 128"), one or more intelligent, multi-sensing, network-connected alarm systems 130, one or more intelligent, multi-sensing, network-connected camera systems 132, and one or more intelligent, multi-sensing, network-connected wall switches 136. In some implementations, the smart home devices in the smart home environment 100 of FIG. 1 includes a plurality of intelligent, multi-sensing, network-connected appliances 138 (hereinafter referred to as "smart appliances 138"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth.

The smart home devices in the smart home environment 100 may additionally or alternatively include one or more other occupancy sensors (e.g., touch screens, IR sensors, ambient light sensors and motion detectors). In some implementations, the smart home devices in the smart home environment 100 include radio-frequency identification (RFID) readers (e.g., in each room 152 or a portion thereof) that determine occupancy based on RFID tags located on or embedded in occupants. For example, RFID readers may be integrated into the smart hazard detectors.

In some implementations, in addition to containing sensing capabilities, devices 122, 124, 126, 128, 130, 132, 136, 138, and 190 (which are collectively referred to as "the smart home devices" or "the smart home devices 120") are capable of data communications and information sharing with other smart home devices, a central server or cloud-computing system, and/or other devices (e.g., the client device 104, the cast devices 108 and the voice-activated electronic devices 190) that are network-connected. Similarly, each of the cast devices 108 and the voice-activated electronic devices 190 is also capable of data communications and information sharing with other cast devices 108, voice-activated electronic devices 190, smart home devices, a central server or cloud-computing system 140, and/or other devices (e.g., the client device 104) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the cast devices 108, the electronic devices 190 and the smart home devices serve as wireless or wired repeaters. In some implementations, a first one of and the cast devices 108 communicates with a second one of the cast devices 108 and the smart home devices 120 via a wireless router. The cast devices 108, the electronic devices 190 and the smart home devices 120 may further communicate with each other via a connection (e.g., network interface 160) to a network, such as the Internet 110. Through the Internet 110, the cast devices 108, the electronic devices 190 and the smart home devices 120 may communicate with a server system 140 (also called a central server system and/or a cloud-computing system herein). Optionally, the server system 140 may be associated with a manufacturer, support entity, or service provider associated with the cast devices 108 and the media content displayed to the user.

In general, any of the connected electronic devices described herein can be configured with a range of capabilities for interacting with users in the environment. For example, an electronic device can be configured with one or more microphones, one or more speakers and voice-interaction capabilities in which a user interacts with the device display assistant device via voice inputs received by the microphone and audible outputs played back by the speakers to present information to users. Similarly, an electronic device can be configured with buttons, switches and/or other touch-responsive sensors (such as a touch screen, touch panel, or capacitive or resistive touch sensors) to receive user inputs, and with haptic or other tactile feedback capabilities to provide tactile outputs to users. An electronic device can also be configured with visual output capabilities, such as a display panel and/or one or more indicator lights to output information to users visually, as described in U.S. patent application Ser. No. 15/592,120, titled "LED Design Language for Visual Affordance of Voice User Interfaces," which is incorporated herein by reference. In addition, an electronic device can be configured with movement sensors that can detect movement of objects and people in proximity to the electronic device, such as a radar transceiver(s) or PIR detector(s), as described in U.S. patent application Ser. No. 15/481,289, titled "Systems, Methods, and Devices for Utilizing Radar-Based Touch Interfaces," which is incorporated herein by reference.

Inputs received by any of these sensors can be processed by the electronic device and/or by a server communicatively coupled with the electronic device (e.g., the server system 140 of FIG. 1A). In some implementations, the electronic device and/or the server processes and/or prepares a response to the user's input(s), which response is output by the electronic device via one or more of the electronic device's output capabilities. In some implementations, the electronic device outputs via one or more of the electronic device's output capabilities information that is not directly responsive to a user input, but which is transmitted to the electronic device by a second electronic device in the environment, or by a server communicatively coupled with the electronic device. This transmitted information can be of virtually any type that is displayable/playable by the output capabilities of the electronic device.

The server system 140 provides data processing for monitoring and facilitating review of events (e.g., motion, audio, security, etc.) from data captured by the smart devices 120, such as video cameras 132, smart doorbells 126, and display assistant device 190-4. In some implementations, the server system 140 may include a voice/display assistance server 112 that processes audio inputs collected by voice-activated electronic devices 190, one or more content hosts 114 that provide the displayed media content, and a cloud cast service server 116 creating a virtual user domain based on distributed device terminals. The server system 140 also includes a device registry for keeping a record of the distributed device terminals in the virtual user environment. Examples of the distributed device terminals include, but are not limited to the voice-activated electronic devices 190, cast devices 108, media output devices 106 and smart home devices 122-138. In some implementations, these distributed device terminals are linked to a user account (e.g., a Google user account) in the virtual user domain. In some implementations, each of these functionalities and content hosts is a distinct server within the server system 140. In some implementations, a subset of these functionalities is integrated within the server system 140.

In some implementations, the network interface 160 includes a conventional network device (e.g., a router). The smart home environment 100 of FIG. 1 further includes a hub device 180 that is communicatively coupled to the network(s) 110 directly or via the network interface 160. The hub device 180 is further communicatively coupled to one or more of the above intelligent, multi-sensing, network-connected devices (e.g., the cast devices 108, the electronic devices 190, the smart home devices and the client device 104). Each of these network-connected devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

Figure 2:
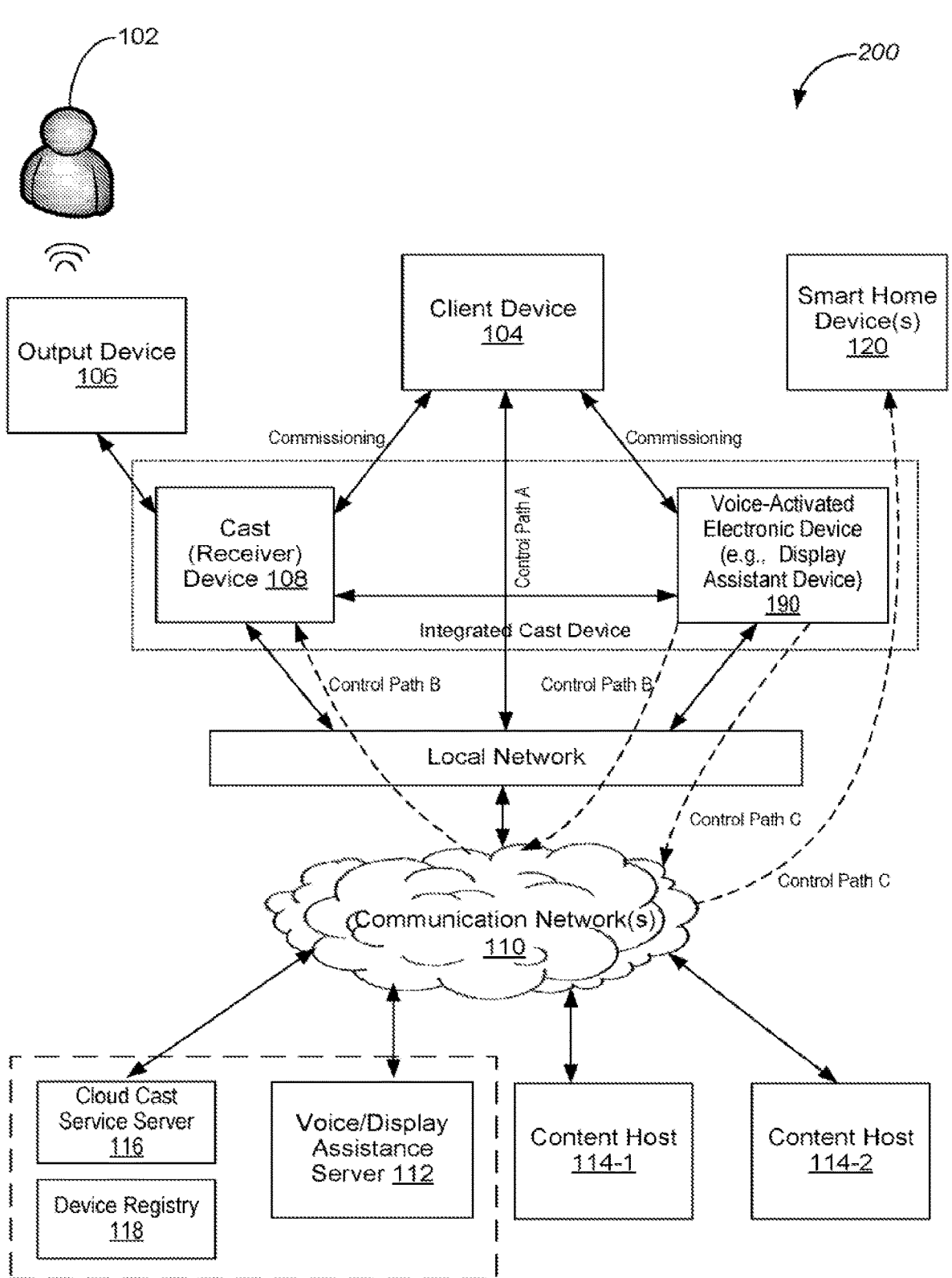
FIG. 2 is an example operating environment in which a voice-activated electronic device (e.g., a display assistant device) interacts with a cast device, a client device or a server system of a smart home environment in accordance with some implementations.

FIG. 2 is an example operating environment 200 in which a voice-activated electronic device 190 (e.g., a display assistant device) interacts with a cast device 108, a client device 104 or a server system 140 of a smart home environment 100 in accordance with some implementations. The voice-activated electronic device 190 is configured to receive audio inputs from an environment in proximity to the voice-activated electronic device 190. Optionally, the electronic device 190 stores the audio inputs and at least partially processes the audio inputs locally. Optionally, the electronic device 190 transmits the received audio inputs or the partially processed audio inputs to a voice/display assistance server 112 via the communication networks 110 for further processing. The cast device 108 is configured to obtain media content or Internet content from one or more content hosts 114 for display on an output device 106 coupled to the cast device 108. As explained above, the cast device 108 and the voice-activated electronic device 190 are linked to each other in a user domain, and more specifically, associated with each other via a user account in the user domain. Information of the cast device 108 and information of the electronic device 190 are stored in the device registry 118 in association with the user account.

In some implementations, the cast device 108 does not include any display screen, and the voice-activated electronic device 190 includes a display assistant device that has a display screen. Both the cast device 108 and the display assistant device 190 have to rely on the client device 104 to provide a user interface during a commissioning process. Specifically, the client device 104 is installed with an application that enables a user interface to facilitate commissioning of a new cast device 108 or a new display assistant device 190 disposed in proximity to the client device 104. A user may send a request on the user interface of the client device 104 to initiate a commissioning process for the new cast device 108 or display assistant device 190 that needs to be commissioned. After receiving the commissioning request, the client device 104 establishes a short range communication link with the new cast device 108 or display assistant device 190 that needs to be commissioned. Optionally, the short range communication link is established based near field communication (NFC), Bluetooth, Bluetooth Low Energy (BLE) and the like. The client device 104 then conveys wireless configuration data associated with a wireless local area network (WLAN) to the new cast device 108 or display assistant device 190. The wireless configuration data includes at least a WLAN security code (i.e., service set identifier (SSID) password), and optionally includes an SSID, an Internet protocol (IP) address, proxy configuration and gateway configuration. After receiving the wireless configuration data via the short range communication link, the new cast device 108 or display assistant device 190 decodes and recovers the wireless configuration data, and joins the WLAN based on the wireless configuration data.

Additional user domain information is entered on the user interface displayed on the client device 104, and used to link the new cast device 108 or display assistant device 190 to an account in a user domain. Optionally, the additional user domain information is conveyed to the new cast device 108 or display assistant device 190 in conjunction with the wireless communication data via the short range communication link. Optionally, the additional user domain information is conveyed to the new cast device 108 or display assistant device 190 via the WLAN after the new device has joined the WLAN.

Once the cast device 108 and display assistant device 190 have been commissioned into the user domain, the cast device 108, the output device 106 and their associated media play activities could be controlled via two control paths (control path A and control path B). In accordance with control path A, a cast device application or one or more media play applications installed on the client device 104 are used to control the cast device 108 and its associated media play activities. Alternatively, in accordance with control path B, the display assistant device 190 is used to enable eyes-free and hands-free control of the cast device 108 and its associated media play activities (e.g., playback of media content play on the output device 106).

In some implementations, the cast device 108 and display assistant device 190 are two distinct and different devices that are configured to act as a cast receiver device and a cast transmitter device, respectively. The display assistant device 190 can provide information or content (which is generated locally or received from another source) to be projected onto the output device 106 via the cast device 108. Alternatively, in some implementations, the cast device 108 and display assistant device 190 are combined in an integrated cast device that is coupled to the output device 106.

In some situations, the smart home environment 100 includes one or more smart home devices 220 (e.g., thermostats 122, hazard detectors 124, doorbells 126, door locks 128, alarm systems 130, camera systems 132, wall switches 136 and smart appliances 138 in FIG. 1). Regardless of whether a smart home device 220 has a display screen, it can rely on the client device 104 to provide a user interface during a commissioning process. Specifically, the client device 104 is installed with a smart device application that enables a user interface to facilitate commissioning of a new smart home device 120. Like a new cast device 108 or display assistant device 190, the new smart home device 120 can establish a short range communication link with the client device 104, and the wireless configuration data are communicated to the new smart home device 120 via the short range communication link, allowing the smart home device 120 to join the WLAN based on the wireless configuration data. Further, the smart home device 120 is optionally linked to the account of the user domain to which the cast device 108 and display assistant device 190 are linked as well. Once the smart home device 120 and the display assistant device 190 have been commissioned into the user domain, the smart home device 120 could be monitored and controlled via the display assistant device 190 in accordance with Control Path C as the cast device 108 is controlled via the display assistant device 190 in accordance with Control Path B. For example, voice commands can be inputted into the display assistant device 190 to review recording of an outdoor camera 132 mounted next to a door and control a door lock 128 based on security events detected in the recordings.

Referring to FIG. 2, after the cast device 108 and the voice-activated electronic device 190 are both commissioned and linked to a common user domain, the voice-activated electronic device 190 can be used as a voice user interface to enable eyes-free and hands-free control of media content streaming to the cast device 108 involving no remote control, client device 104 or other second screen device. For example, the user may give voice commands such as "Play Lady Gaga on Living Room speakers." A Lady Gaga music track or video clip is streamed to a cast device 108 associated with the "Living Room speakers." The client device 104 is not involved, nor is any cast device application or media play application loaded on the client device 104.

The cloud cast service 116 is the proxy service that communicatively links the voice-activated electronic device 190 to the cast device 108 and makes casting to the cast device 108 possible without involving any applications on the client device 104. For example, a voice message is recorded by an electronic device 190, and the voice message is configured to request media play on a media output device 106. Optionally, the electronic device 190 partially processes the voice message locally. Optionally, the electronic device 190 transmits the voice message or the partially processed voice message to a voice/display assistance server 112 via the communication networks 110 for further processing. A cloud cast service server 116 determines that the voice message includes a first media play request, and that the first media play request includes a user voice command to play media content on a media output device 106 and a user voice designation of the media output device 106. The user voice command further includes at least information of a first media play application (e.g., YouTube and Netflix) and the media content (e.g., Lady Gaga music) that needs to be played.

In accordance with the voice designation of the media output device 106, the cloud cast service server 116 in a device registry 118 a cast device associated in the user domain with the electronic device 190 and coupled to the media output device 106. The cast device 108 is configured to execute one or more media play applications for controlling the media output device 106 to play media content received from one or more media content hosts 114. Then, the cloud cast service server 116 sends to the cast device 108 a second media play request including the information of the first media play application and the media content that needs to be played. Upon receiving the information sent by the cloud cast service server 116, the cast device 108 executes the first media play application and controls the media output device 106 to play the requested media content.

In some implementations, the user voice designation of the media output device 106 includes description of the destination media output device. The cloud cast service server 116 identifies in the registry the destination media output device among a plurality of media output devices according to the description of the destination media output device. In some implementations, the description of the destination media output device includes at least a brand ("Samsung TV") or a location of the media output device 106 ("my Living Room TV").

In some implementations, the smart home environment 100 includes a plurality of cast devices 108, a plurality of output devices 106 and one or more voice-activated electronic devices 190. The cast devices 108 are communicatively coupled to the cloud cast service server 116 and the content hosts 114, while every two of them are optionally located in the same location (e.g., the living room) or two distinct locations (e.g., two rooms) in the smart home environment 100. Each of the cast devices 108 is configured to obtain media or Internet content from the media hosts 114 for display on the output device 106 coupled to the respective cast device 108. The one or more voice-activated electronic devices 190 are communicatively coupled to the cloud cast service server 116 and the voice/display assistance server 112. The one or more voice-activated electronic devices 190 includes at least one display assistant device. In some implementations, the voice-activated electronic devices 190 are disposed independently of the cast devices 108 and the output devices 106. For example, as shown in FIG. 1, the electronic device 190-4 is disposed in a room where no cast device 108 or output device 106 is located. In some implementations, the electronic device 190-1 is disposed in proximity to the cast device 108-1 and the output device 106-1, and therefore, the electronic device 190-1, the cast device 108-1 and the output device 106-1 are located in the same room.

Referring to FIG. 1, when media content is being played on the first output device 106-1, a user may send a voice command to any of the electronic devices 190 (e.g., 190-1, 190-2, 190-3 and 190-4 in FIG. 1) to request play of the media content to be transferred to the second output device 106-2. The voice command includes a media play transfer request. The voice command is transmitted to the cloud cast service server 116. The cloud cast service server 116 sends a media display information request to the first cast device 108-1 to request instant media play information of the media content that is currently being played on the first output device 106-1 coupled to the first cast device 108-1. The first cast device 108-1 then returns to the cloud cast service server 116 the requested instant play information including at least information of a first media play application (e.g., YouTube), the media content that is currently being played (e.g., "Lady Gaga—National Anthem—Super Bowl 2016"), and a temporal position related to playing of the media content. The second cast device 108-2 then receives a media display request including the instant play information from the cloud cast service server 116, and in accordance with the instant play information, executes the first media play application that controls the second output device 106-2 to play the media content from the temporal location.

Figure 3:
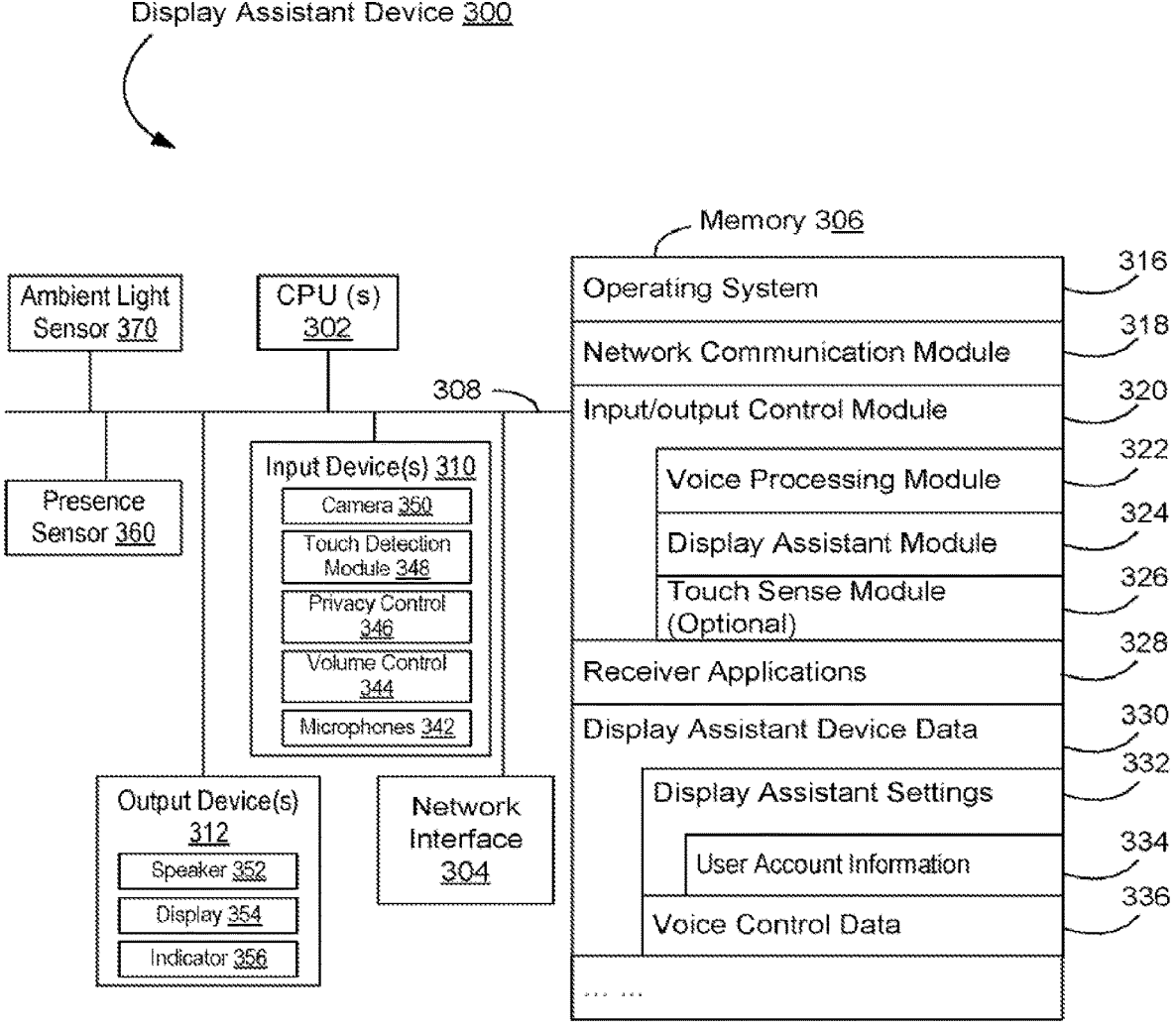
FIG. 3 is a block diagram illustrating an example display assistant device that is applied as a voice interface to collect user voice commands in a smart home environment in accordance with some implementations.

FIG. 3 is a block diagram illustrating an example display assistant device 300 that is applied as a voice interface to collect user voice commands in a smart home environment 100 in accordance with some implementations. The display assistant device 300 typically includes one or more processing units (CPUs) 302, one or more network interfaces 304, memory 306, and one or more communication buses 308 for interconnecting these components (sometimes called a chipset). The display assistant device 300 includes one or more output devices 312, including one or more speakers 352, a display 354 and one or more indicators 356. The display assistant device 300 also includes one or more input devices 310 that facilitate user input, including one or more microphones 342, a volume control 344 and a privacy control 346. The volume control 344 is configured to receive a user action (e.g., a press on a volume up button or a volume down button, a press on both volumes up and down buttons for an extended length of time) that controls a volume level of the speakers 352 or resets the display assistant device 300. The privacy control 346 is configured to receive a user action that controls privacy settings of the display assistant device (e.g., whether to deactivate the microphones 342). The one or more indicator 356 is configured to indicate at least whether the microphone 342 is deactivated (e.g., muted). In some implementations, the input devices 310 of the display assistant device 300 include a touch detection module 348 that is integrated on the display panel 354 and configured to detect touch inputs on its surface. In some implementations, the input devices 310 of the display assistant device 300 include a camera module 350 configured to capture a video stream of a field of view. Alternatively, in some implementations, the input devices 310 of the display assistant device 300 does not include any camera or touch detection module, because they are relatively expensive and can compromise the goal of offering the display assistant device 300 as a low cost user interface solution.

In some implementations, the display assistant device 300 further includes a presence sensor 360 configured to detect a presence of a user in a predetermined area surrounding the display assistant device 300. Under some circumstances, the display assistant device 300 operates at a sleep or hibernation mode that deactivates detection and processing of audio inputs, and does not wake up from the sleep or hibernation mode or listen to the ambient (i.e., processing audio signals collected from the ambient) until the presence sensor 360 detects a presence of a user in the predetermined area. An example of the presence sensor 360 is an ultrasonic sensor configured to detect a presence of a user.

In some implementations, the display assistant device 300 further includes an ambient light sensor 370 (e.g., a white ambient light sensor, an RGB color sensor). The ambient light sensor 370 is configured to detect a light condition in the smart home environment 100 where the display assistant device 300 sits. In some implementations, the display assistant device 300 is configure to adjust a brightness level and/or a color tone of its screen according to the light condition. The ambient light sensor 370 are disposed behind a bezel area of the screen of the display assistant device 300, and exposed to light via transparent part of the bezel area.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other nonvolatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

Operating system 316 including procedures for handling various basic system services and for performing hardware dependent tasks;

Network communication module 318 for connecting the display assistant device 300 to other devices (e.g., the server system 140, cast device 108, client device 104, smart home devices 120 and other voice-activated electronic device(s) 190) via one or more network interfaces 304 (wired or wireless) and one or more networks 110, such as the Internet, other wide area networks, local area networks, metropolitan area networks, and so on;

Input/output control module 320 for receiving inputs via one or more input devices 310 enabling presentation of information at the display assistant device 300 via one or more output devices 312, including:

Voice processing module 322 for processing audio inputs or voice messages collected in an environment surrounding the display assistant device 300, or preparing the collected audio inputs or voice messages for processing at a voice/display assistance server 112 or a cloud cast service server;

Display assistant module 324 for displaying additional visual information including but not limited to a media content item (e.g., a YouTube video clip), news post, social media message, weather information, personal picture, a state of audio input processing, and readings of smart home devices; and Touch sense module 326 for sensing touch events associated with the touch detection module 348 on a top surface of the display assistant device 300; and One or more receiver application 328 for responding to user commands extracted from audio inputs or voice messages collected in an environment surrounding the display assistant device 300, including but not limited to, a media play application, an Internet search application, a social network application and a smart device application;

Display assistant device data 330 storing at least data associated with the display assistant device 300, including:

Display assistant settings 332 for storing information associated with the display assistant device 300 itself, including common device settings (e.g., service tier, device model, storage capacity, processing capabilities, communication capabilities, etc.) and information of a user account 334 in a virtual user domain to which the display assistant device 300 is linked; and Voice control data 336 for storing audio signals, voice messages, response messages and other data related to voice interface functions of the display assistant device 300.

In some implementations, the input/output control module 320 further includes an image processing module (not shown) configured to process image data captured by the camera module 350. Specifically, in an example, the image processing module is configured to analyze the image data captured by the camera module 350 and associate biometric features (e.g., face, voice and gesture) recognized from the image data with known or unknown users. User profiles can be selected based on the biometric features to control the display assistant device 300 itself, cast devices 106 or smart home devices adaptively.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
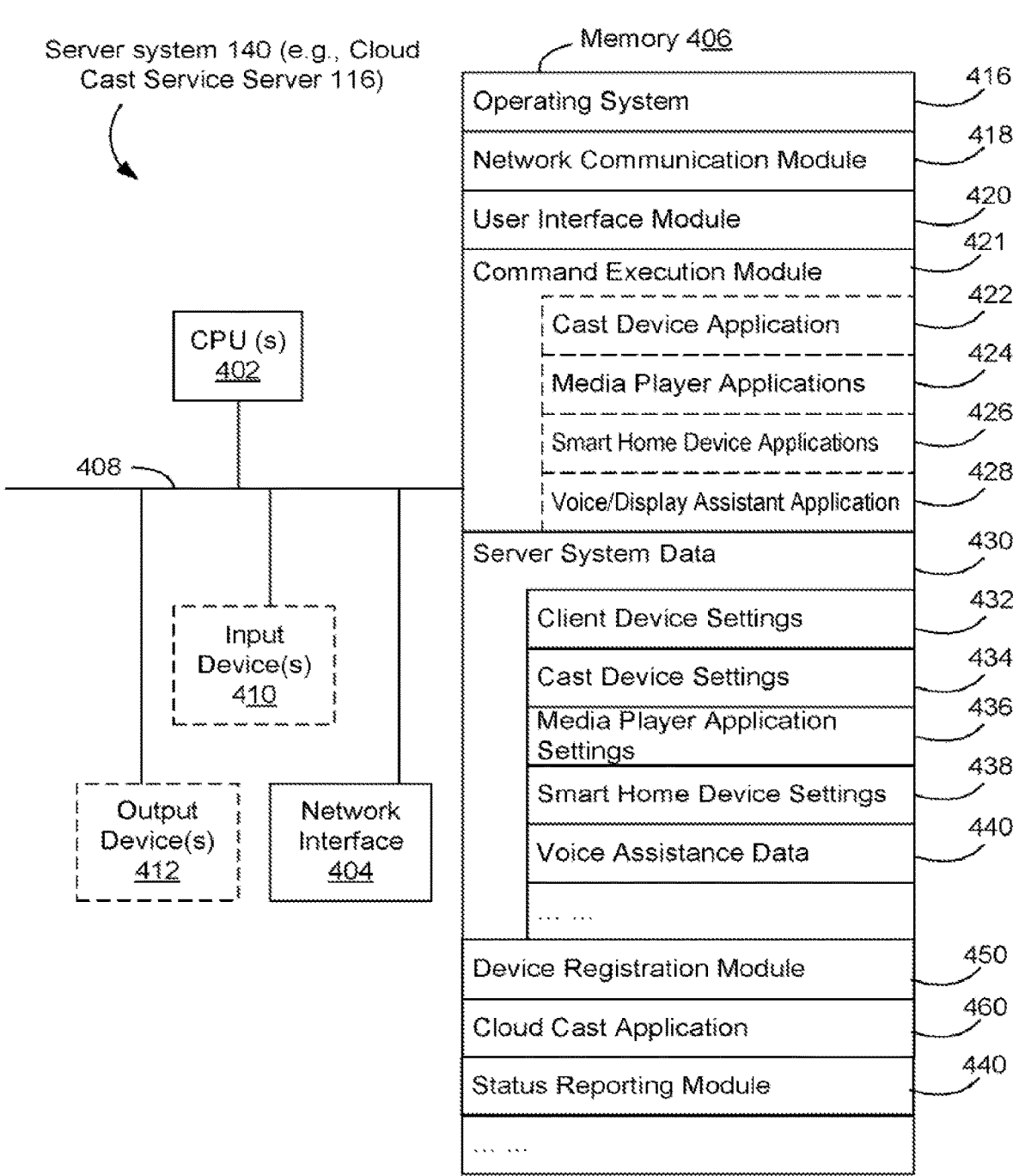
FIG. 4 is a block diagram illustrating an example server in the server system of a smart home environment in accordance with some implementations.

FIG. 4 is a block diagram illustrating an example server in the server system 140 of a smart home environment 100 in accordance with some implementations. An example server is one of a cloud cast service sever 116. The server system 140, typically, includes one or more processing units (CPUs) 402, one or more network interfaces 404, memory 406, and one or more communication buses 408 for interconnecting these components (sometimes called a chipset). The server system 140 could include one or more input devices 410 that facilitate user input, such as a keyboard, a mouse, a voice-command input unit or microphone, a touch screen display, a touch-sensitive input pad, a gesture capturing camera, or other input buttons or controls. Furthermore, the server system 140 could use a microphone and voice recognition or a camera and gesture recognition to supplement or replace the keyboard. In some implementations, the server system 140 includes one or more cameras, scanners, or photo sensor units for capturing images, for example, of graphic series codes printed on the electronic devices. The server system 140 could also include one or more output devices 412 that enable presentation of user interfaces and display content, including one or more speakers and/or one or more visual displays.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other nonvolatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

Operating system 416 including procedures for handling various basic system services and for performing hardware dependent tasks;

Network communication module 418 for connecting the server system 140 to other devices (e.g., various servers in the server system 140, client device 104, cast device 108, and smart home devices 120) via one or more network interfaces 404 (wired or wireless) and one or more networks 110, such as the Internet, other wide area networks, local area networks, metropolitan area networks, and so on;

User interface module 420 for enabling presentation of information (e.g., a graphical user interface for presenting applications, widgets, websites and web pages thereof, and/or games, audio and/or video content, text, etc.) at the client device 104;

Command execution module 421 for execution on the server side (e.g., games, social network applications, smart home applications, and/or other web or non-web based applications for controlling the client device 104, cast devices 108, voice activated electronic device 190 (e.g., a display assistant device 300) and smart home devices 120 and reviewing data captured by such devices), including one or more of:

a cast device application 422 that is executed to provide server-side functionalities for device provisioning, device control, and user account management associated with cast device(s) 108;

one or more media player applications 424 that is executed to provide server-side functionalities for media display and user account management associated with corresponding media sources;

one or more smart home device applications 426 that is executed to provide server-side functionalities for device provisioning, device control, data processing and data review of corresponding smart home devices 120; and a voice/display assistant application 428 that is executed to arrange voice processing of a voice message received from a voice-activated electronic device 190, directly process the voice message to extract a user voice command and a designation of a cast device 108 or another voice-activated electronic device 190, and/or enable a voice-activated electronic device 190 to play media content (audio or video); and Server system data 430 storing at least data associated with automatic control of media display (e.g., in an automatic media output mode and a follow-up mode), including one or more of:

Client device settings 432 for storing information associated with the client devices 104, including common device settings (e.g., service tier, device model, storage capacity, processing capabilities, communication capabilities, etc.), and information for automatic media display control;

Cast device settings 434 for storing information associated with user accounts of the cast device application 422, including one or more of account access information, information for device settings (e.g., service tier, device model, storage capacity, processing capabilities, communication capabilities, etc.), and information for automatic media display control;

Media player application settings 436 for storing information associated with user accounts of one or more media player applications 424, including one or more of account access information, user preferences of media content types, review history data, and information for automatic media display control;

Smart home device settings 438 for storing information associated with user accounts of the smart home applications 426, including one or more of account access information, information for one or more smart home devices 120 (e.g., service tier, device model, storage capacity, processing capabilities, communication capabilities, etc.); and Voice assistance data 440 for storing information associated with user accounts of the voice/display assistant application 428, including one or more of account access information, information for one or more display assistant devices 190 (e.g., service tier, device model, storage capacity, processing capabilities, communication capabilities, etc.).

When the server system 140 includes a cloud cast service server 116, memory 406, or the non-transitory computer readable storage medium of memory 406, stores the following programs, modules, and data structures, or a subset or superset thereof:

Device registration module 450 for managing the device registry 118 coupled to the cloud cast service server 116;

Cloud cast application 460 for relaying a user voice command identified in a voice message to one or more of the cast device(s) 180, electronic device(s) 190 and smart home device(s) 120 that are coupled in a cloud cast user domain; and Status reporting module 470 for maintaining the states of the cast device(s) 180, electronic device(s) 190 and smart home device(s) 120 that are coupled in a cloud cast user domain.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

Figure 5A:
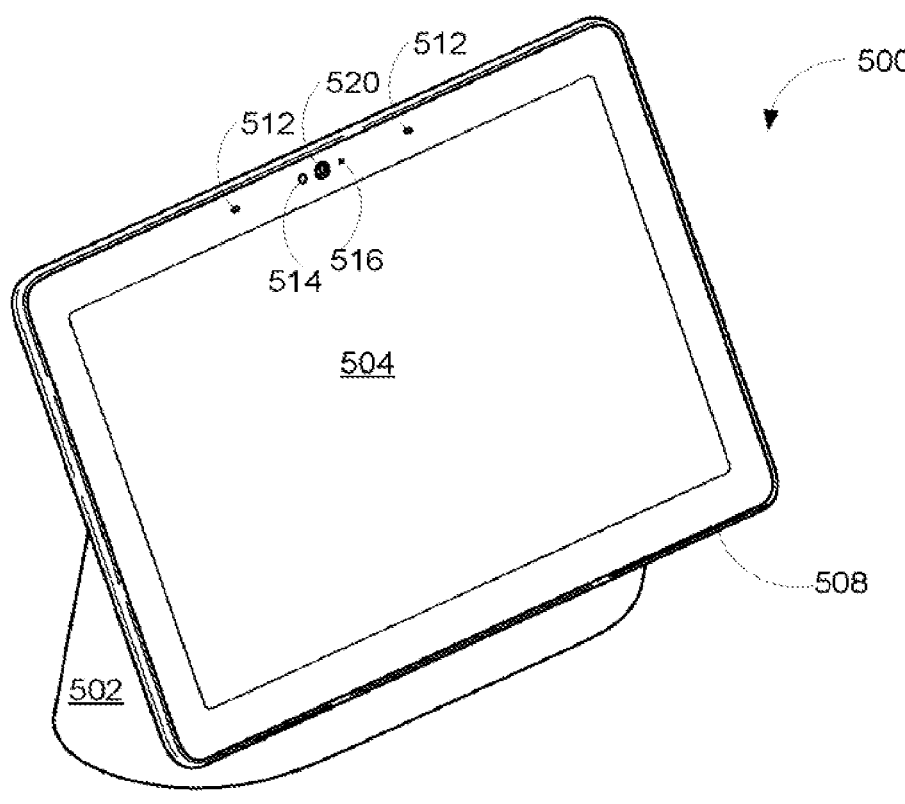
FIGS. 5A-5F are a perspective view, a front view, a rear view, a side view, a top view and a bottom view of a display assistant device in accordance with some implementations, respectively.
Figure 5B:
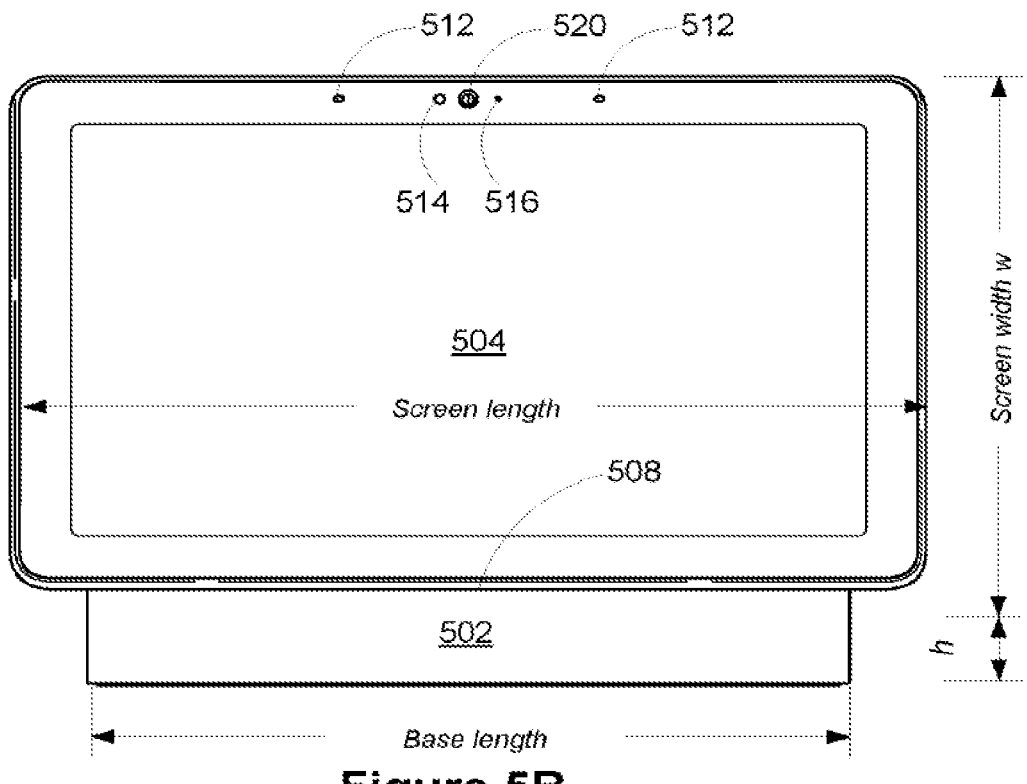

FIGS. 5A-5F are a perspective view, a front view, a rear view, a side view, a top view and a bottom view of a display assistant device 500 in accordance with some implementations, respectively. The display assistant device 500 includes a base 502 and a screen 504. The base 502 is configured for sitting on a surface (e.g., which is substantially flat in some situations). The screen 504 has a rear surface 506 at which the screen 504 is supported by the base. In some implementations, the base and the screen are coupled to each other via a plurality of fasteners (e.g., 1210 in FIG. 12), and cannot be detached from each other by human manual manipulation without using a tool. A bottom edge 508 of the screen 504 is configured to be held above the surface by a predefined height h. Referring to FIG. 5B, the base 502 is substantially hidden behind the screen 504 from the front view of the display assistant device 500. That said, the predefined height h is less than a predetermined threshold (e.g., 15 mm), such that the screen 504 appears to float in air and the base 502 can be substantially hidden behind the screen 504 from the front view of the display assistant device. In an example, the predetermined threshold is 10% of a width w of the screen 504. If the screen 504 is a seven-inch screen having a width of 5 inch, the bottom edge 508 of the screen 504 is held above the surface by a height of 12.7 mm or below.

Figure 5C:
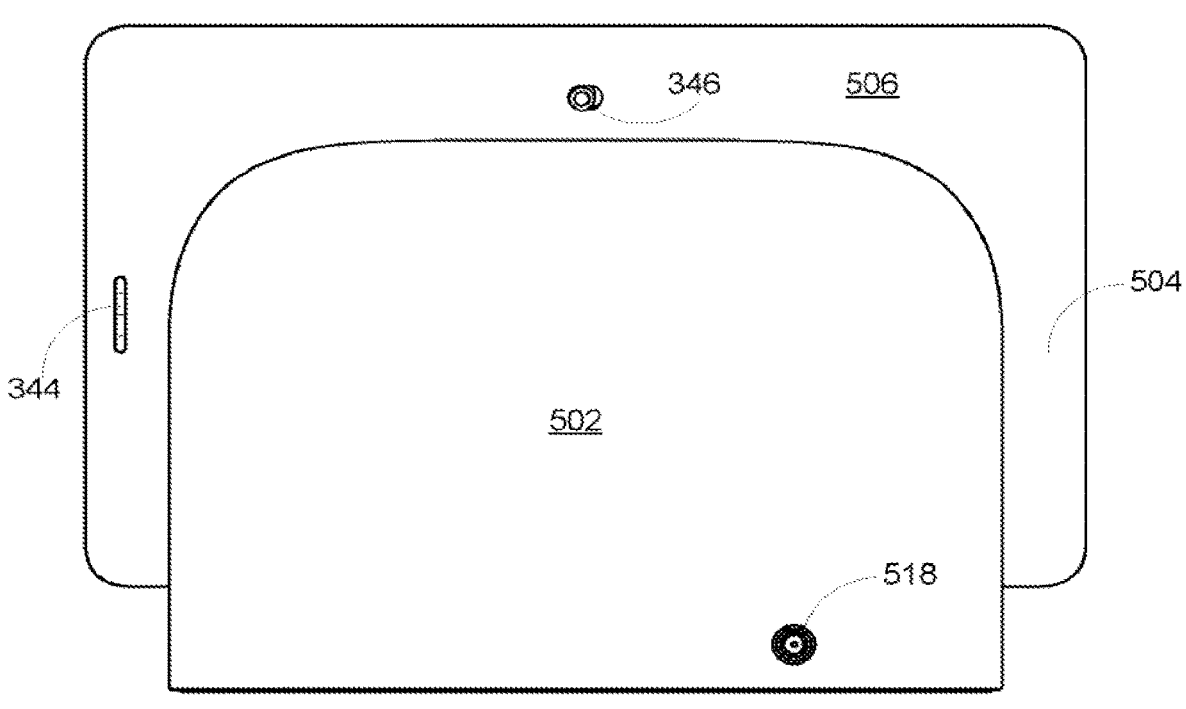
Figure 5D:
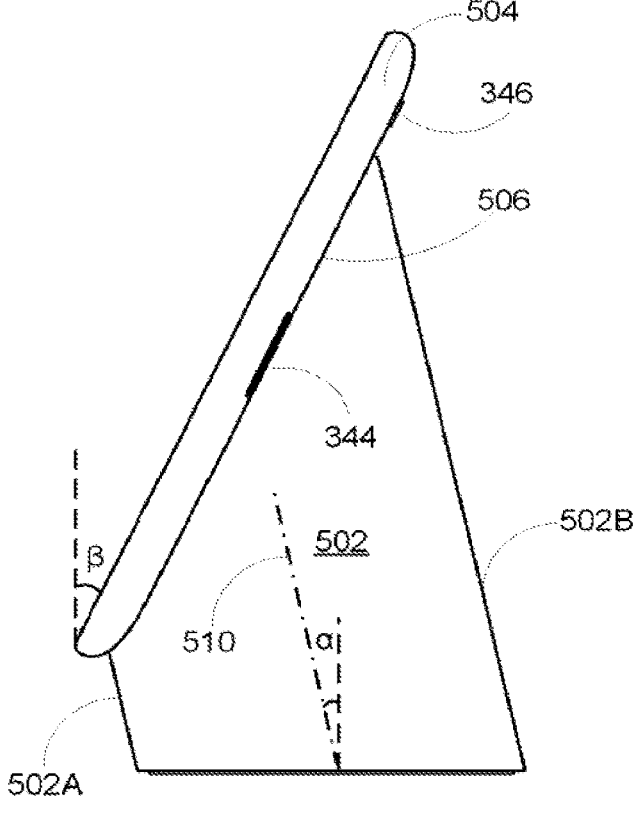
Figure 5E:
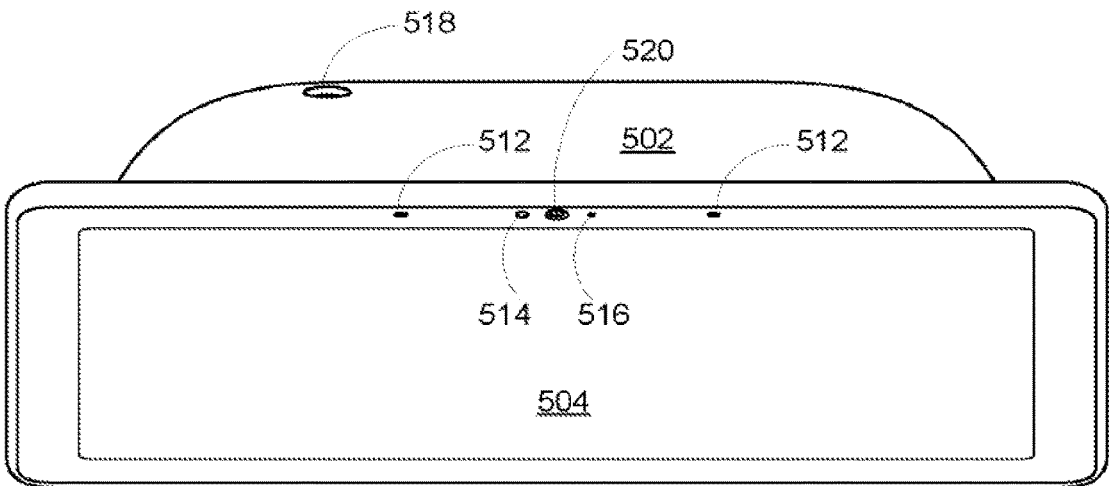
Figure 5F:
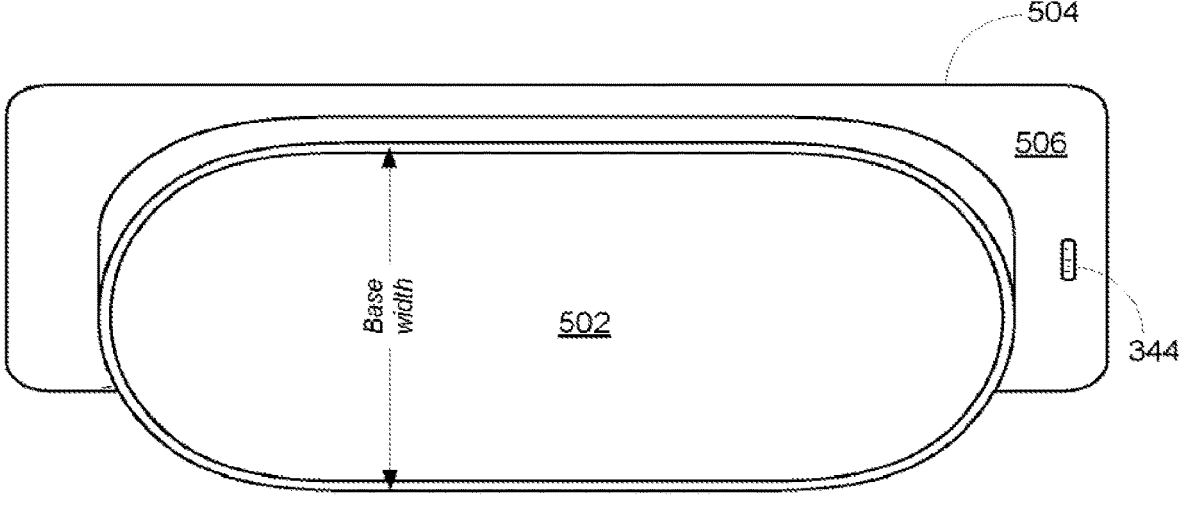

Referring to FIG. 5D, in some implementations, the base 502 extends along a central axis 510, and the central axis 510 of the base 502 is not perpendicular to the surface when the base 502 sits on the surface (which is substantially flat herein). Optionally. the base 502 has a front side 502A and a rear side 502B both of which are parallel with the central axis 510. The central axis 510, front side 502A and rear side 502B of the base 502 lean forward by a base angle a when the base sits on the surface. It is noted that the front side 502A of the base is shorter than the rear side 502B of the base, e.g., a height of the front side 502A is only 20% of that of the rear side 502B. When the screen 504 is supported by the base 502 at its rear surface 506, the screen 504 is not perpendicular to the surface, but faces substantially forward and leans slightly backward by a screen angle β for the purposes of providing a desirable viewing angle for an average user. In an example, both the base angle a and the screen angle β are equal to 15 degrees, except that the base leans forward by the base angle a of 15 degrees and the screen leans backward by the screen angle β of 15 degrees. By these means, the display assistant device 500 does not tip over (forward or backward) easily when a blunt force F hits a top edge of the display assistant device 500 or a user touch occurs to the screen 202 of the display assistant device 500.

The base 502 acts as a speaker box (i.e., an enclosure structure of one or more speakers). A rear speaker (e.g., 616 in FIGS. 6A and 6B) is concealed inside the base 502 and configured to project sound substantially towards the rear view of the display assistant device, i.e., to project sound out of the base 502 substantially via the rear side 502B of the base 502. The rear speaker is oriented to project audio towards the rear side 502B of the base 502. In some implementations, the base 502 further conceals one or more front speakers (e.g., 620 in FIGS. 6A and 6B). Each front speaker faces the front view of the display assistant device 500 (i.e., is oriented to project audio towards the front side 502A) and is configured to project sound out of the base 502 substantially via the front side 502A of the base 502. That said, each front speaker projects the sound through a space of the predefined height h separating the bottom edge 508 of the screen 504 and the surface on which the display assistant device 500 is configured to sit. Further, in some implementations, the rear speaker includes a woofer speaker configured to produce first audio frequencies in a first frequency range, and each of the one or more front speakers includes a tweeter speaker configured to produce second audio frequencies in a second frequency range. The second audio frequencies of the front speakers are higher than the first audio frequencies of the rear speaker.

That said, in an example, the rear and front speakers form an integrated 2.1 speaker system that provides stereo effect and high-quality indoor sound enjoyment. A given stereo component can divert low frequencies (e.g., <100 Hz) to a dedicated subwoofer (i.e., the rear speaker) rather than to the two front speakers along with all other frequencies. Optionally, the integrated 2.1 speaker system does not require, from recordings, anything more than two audio tracks, a left and a right. The integrated 2.1 speaker system allows for reducing strain and size on the front speakers, and is thereby used to compensate for poor acoustics in a room, resulting in punchy mid-upper bass ranges with little or no production of intended rumbles.

Referring to FIG. 5B, the display assistant device 500 has a substantially narrow bezel area surrounding an active display area of the screen 504. The bezel area is optionally white and has a bezel width less than a threshold width (e.g., a fixed value of 5 mm or %5 of the screen width w). In some implementations, the active display area has a plurality of rounded corners. The rounded corners are formed when white paint is applied on a rear surface of a cover glass (e.g., 902 in FIGS. 9A and 9B) to define the active display area. In some implementations, an array of display pixels that are visible via a transparent portion of the cover glass are also rounded, i.e., a subset of display pixels that are outside the rounded corners are not driven to display any color and brightness information that varies with time.

In some implementations, the bezel area includes a subset of one or more microphone holes 512, an indicator window 514, a camera window 520 and a sensor window 516. One or more microphones 342 may be placed behind the microphone holes 512 and configured to collect sound from the ambient of the display assistant device 500. An indicator may be disposed behind the indicator window 514, and configured to provide a sequential lighting pattern to indicate whether the display assistant device 500 is active or inactive, whether the display assistant device 500 is mute or not, and/or a voice processing state (e.g., hot word detection, listening, thinking and speaking). A camera module 350 may be disposed behind the camera window 520 to capture a video stream of a field of view. An ambient light sensor 370 may be disposed behind the sensor window 516 and configured to detect a light condition in the smart home environment 100 where the display assistant device 500 sits. More details on these input and output devices are explained below with reference to FIGS. 9A and 9B.

Referring to FIG. 5C, the display assistant device 500 further includes a volume control 344, a privacy control 346 and a power adaptor interface 518. In this example, the volume control button 344 and privacy control 346 are disposed on the rear surface 506 of the screen 504, and the power adaptor interface 518 is disposed on the rear side 502B of the base 502. The volume control 344 includes a mechanical assembly (e.g., a button, a knob, a switch) configure to receive a user input for adjusting a volume level of the speaker in the display assistant device 500. In an example, the volume control 344 includes two buttons (separated or connected) configured to initiate an increase or decrease of the volume level of the speaker, respectively. In some implementations, the two buttons of the volume control 344 can be pressed concurrently to reset the display assistant device 500, independently of controlling the volume level of the speaker. It is noted that the volume control 344 is not disposed on any edge of the screen 504 of the display assistant device 500. Rather, the volume control 344 is arranged on the rear surface 506 of the screen 504 and has a predefined distance from a short edge of the screen 504, such that when a user grabs the display assistant device 500 by the short edge of the screen 504, the volume control 344 is readily accessible for fingers of the user.

Further, the privacy control 346 disposed on the rear surface 506 is configured to provide privacy protection to a user of the display assistant device 500. For example, the privacy control 346 can mute one or more microphones 342 of the display assistant device 500, disables a camera if there is one in the display assistant device 500, disconnects the display assistant device 500 from the Internet while keeping the display assistant device coupled in a local area network, and/or disconnects the display assistant device from all communication networks available to the display assistant device 500. The type of privacy protection enabled by the privacy control 346 could change according to an identify of a person associated with the display assistant device 500 and/or or a time of a specific moment. In some implementations, when the privacy control 346 is turned on for privacy protection, it dynamically activates one of a group of privacy operations based on a user profile of a user who is identified as associated with the display assistant device 500 in real time (e.g., a person whose image or voice is captured and recognized by the display assistant device 500). Specifically, in an example, the display assistant device 500 has an owner mode, a family mode and a stranger mode each of which is associated with a unique subset of the group of privacy operations, and the user profile is associated with one of these three modes.

Further, in some situations, in accordance with the user profile of the user, the one of the group of privacy operations associated with the display assistant device varies according to a time of a day. The display assistant device 500 may further collect user information (e.g., facial features, voice fingerprints and gestures) using a camera or a microphone and use the user information to identify the user who is associated with the display assistant device 500 in real time and retrieve the user profile of the user for the purposes of setting the type of privacy protection that can be enabled by the privacy control 346. More details on privacy control are explained with reference to PCT Patent Application No. PCT/US18/064449, filed Dec. 7, 2018, titled "Display Assistant Device," which is hereby incorporated by reference in its entirety.

In these implementations, the power adaptor interface 518 of the display assistant device 500 is disposed on the rear side 502B of the base 502. The power adaptor interface 518 includes a female connector to receive a male connector configured to connect the display assistant device 500 to an external power source (e.g., a direct current power source). In some implementations, the display assistant device 500 has to be constantly connected to the external power source, and is powered off when the external power source is disconnected. Alternatively, in some implementations, a power board is coupled to the power adaptor interface 518, and includes a rechargeable battery. The rechargeable battery is configured to be charged with the external power source, and drive the display assistant device 500 temporarily when the external power source is disconnected from the display assistant device 500.

A bottom surface of the base 502 constitutes a footprint of the display assistant device 500. A length of the bottom surface of the base 502 is smaller than (e.g., 75% of) a length of the screen 504, and a width of the bottom surface of the base 502 is significant smaller than (e.g., <40% of) a width w of the screen 504. As a result, the footprint of the display assistant device 500 is substantially small, and the display assistant device 500 can therefore fit into different physical settings (e.g., a kitchen, living room and bedroom) in the smart home environment 100. It is noted that FIGS. 5A-5F are focused on an overall look and mechanical features of the display assistant device 500. More details on functions of the display assistant device 500 are described above with reference to FIGS. 1-4.

Figure 6A:
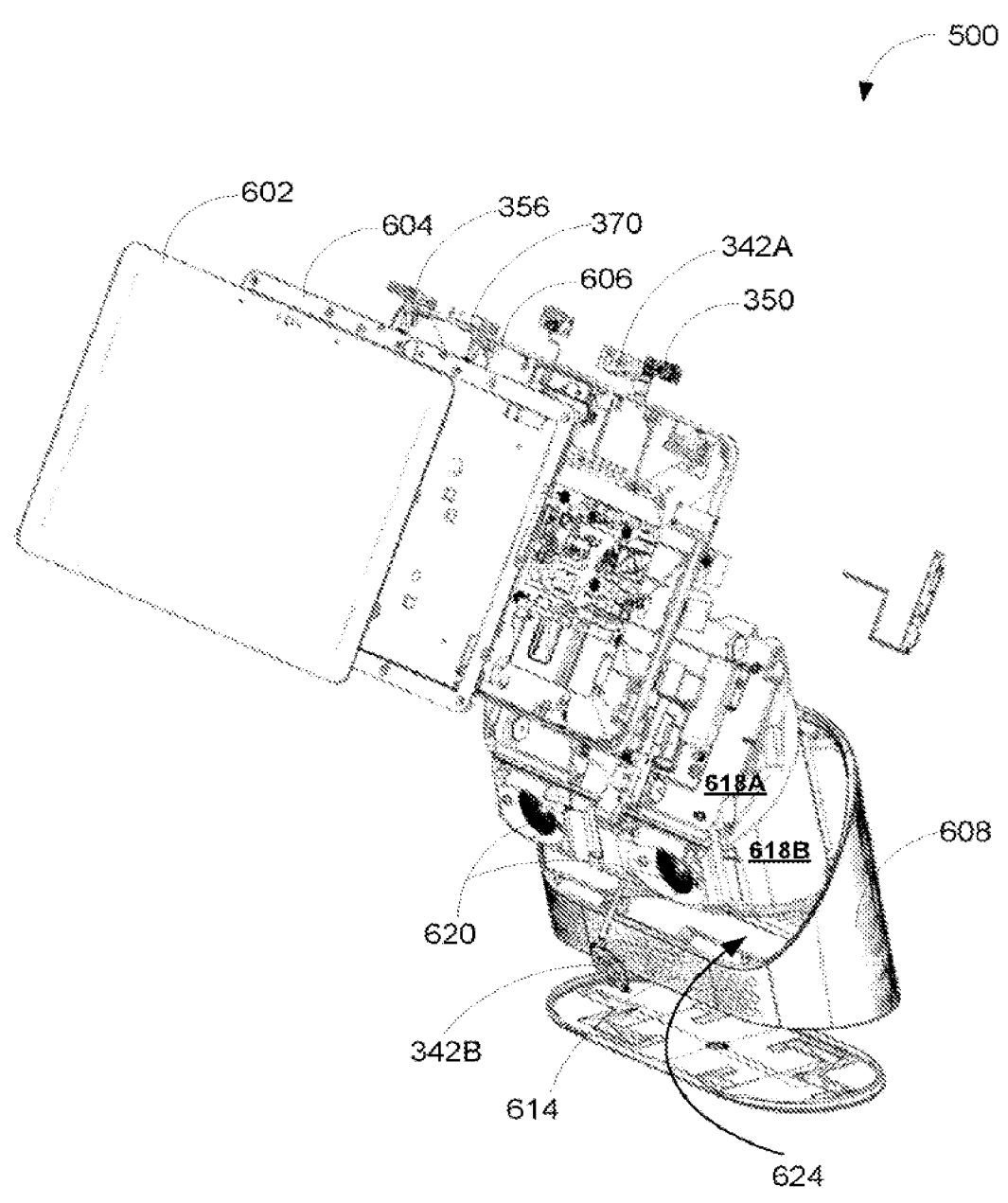
FIGS. 6A and 6B are two exploded views of a display assistant device from a front perspective angle and a rear perspective angle in accordance with some implementations, respectively.
Figure 6B:
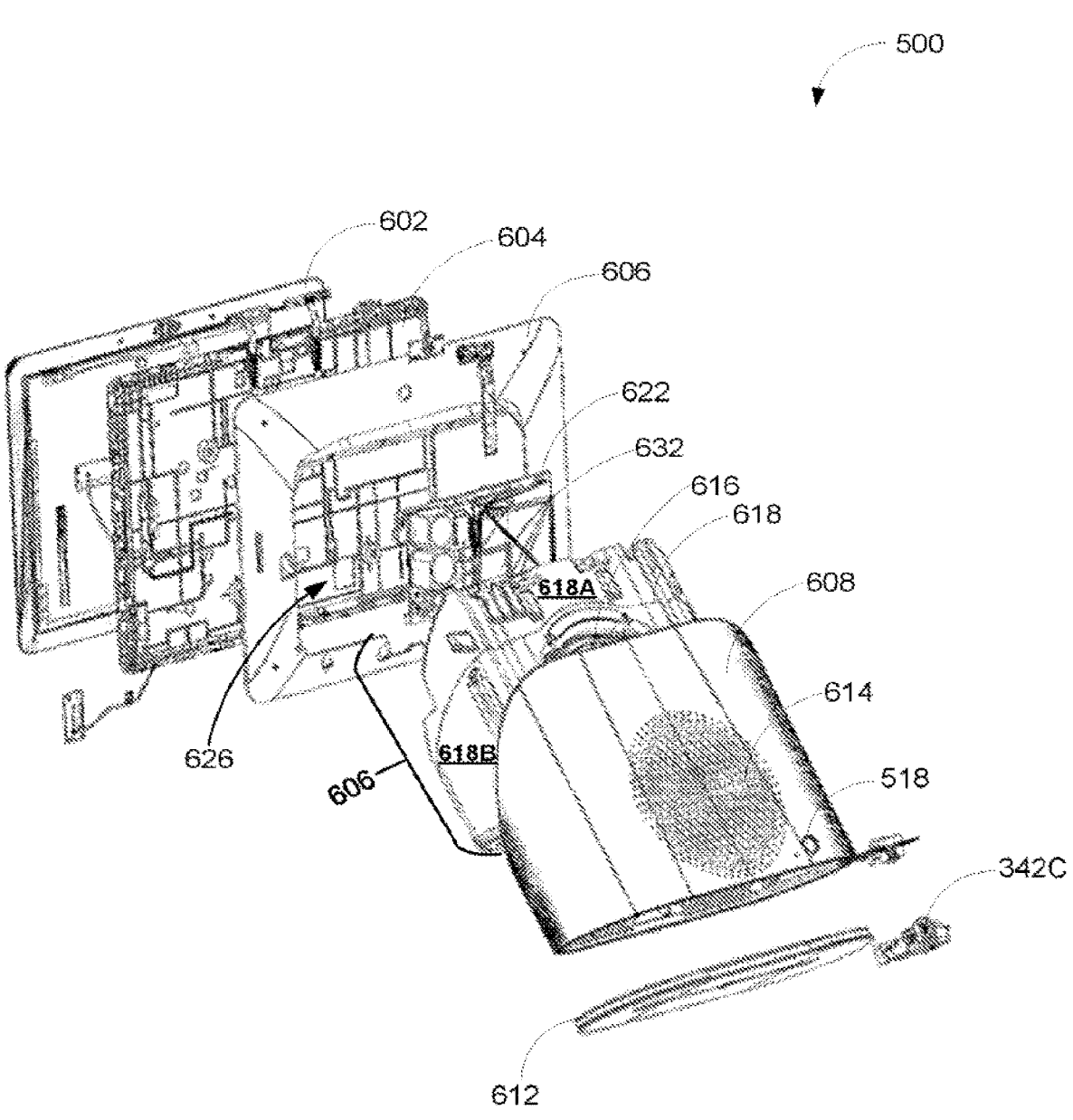

FIGS. 6A and 6B are two exploded views of a display assistant device 500 from a front perspective angle and a rear perspective angle in accordance with some implementations, respectively. The display assistant device 500 includes a base 502 and a screen 504. The screen 504 of the display assistant device 500 includes a display front 602, a middle frame 604 and a back cover 606. The display front 602 is coupled to a display module that is configured to provide backlight sources and drive individual display pixels of the display front 602. The display front 602 and the middle frame 604 are mechanically coupled to each other using an adhesive that is optionally applied adjacent to edges of the display front 602 and middle frame 604. In some implementations, a front surface of the display front 602 has (1) a display active area for presenting information and content and (2) a touch sensing area that is sensitive to touch events. The touch sensing area encloses the display active area and extends beyond the display active area around edges of the display active area.

In some implementations, a thermal spreader can be placed between and comes into contact with the display front 602 and middle frame 604 for redistributing heat generated by a display panel of the display front 602. The display front 602 has a rear surface made of conductive material (e.g., a metal plate), and when the thermal spreader comes into contact with a portion of (e.g., half of) the rear surface of the display front 602, it redistributes heat evenly across itself and the portion of the rear surface of the display front 602, thereby avoiding formation of hot spots on the display front 602. In an example, the thermal spreader includes a graphite sheet.

The base 502 of the display assistant device 500 includes a housing 608, a speaker assembly 610 and a base mount plate 612. The housing 608 encloses the speaker assembly 610, and includes a plurality of speaker grill portions 614 that permit sound generated by the speaker assembly 610 to exit the housing 608 of the base 502. Referring to FIG. 6B, the speaker assembly 610 includes at least a rear speaker 616 mounted in an enclosure structure 618. The rear speaker 616 includes a speaker opening that is exposed from the enclosure structure 618 and faces towards the rear side 502B of the base 502. The enclosure structure 618 provides a sealed enclosure for a rear portion of the rear speaker 616 near the front side 502A of the base 502. The speaker opening of the rear speaker 616 faces backward while being tilted upward with a tilting angle (e.g., angle $A_j$ in FIG. 8A), such that the rear speaker 616 is configured to project a substantial portion of sound generated by the rear speaker 616 backward to exit the housing 608 of the display assistant device 500 via the rear side 502B of the base 502.

Referring to FIG. 6A, in some implementations, the speaker assembly 610 one or more front speakers 620 embedded into the enclosure structure 618. Optionally, each of the one or more front speakers 620 is individually packaged and has its separate sealed enclosure integrated into the enclosure structure 618. Optionally, the enclosure structure 618 includes a distinct sub-structure configured to provide a respective sealed enclosure for each of the one or more front speakers 620. Each front speaker 620 faces a space of the predefined height h that is configured to separate the bottom edge 508 of the screen 504 and a surface on which the display assistant device 500 sits. In some implementations, a respective speaker opening of each front speaker 620 has a dimension substantially greater than the predefined height h of the space and faces forward while being tilted downward with a tilting angle (e.g., angle A2 in FIG. 8B), such that the respective front speaker 620 is configured to project a substantial portion of sound generated by the respective front speaker 620 forward and towards the space between the bottom edge of the screen 504, thereby allowing the generated sound to exit the housing 608 of the display assistant device 500 via the front side 502A of the base 502. Alternatively, in some implementations, the dimension of the respective speaker opening of each front speaker 620 is comparable with the predefined height h of the space, i.e., a projection of the dimension to the predefined height h is substantially equal to the predefined height h (FIG. 8B).

In some implementations, the enclosure structure 618 is configured to guide part of the sound generated by the front speakers 620 and the rear speaker 616 further towards different areas of the housing 608. Specifically, for example, the plurality of speaker grill portions 614 of the housing 608 are distributed on at least a front side, a rear side, a left side and a right side of the housing, and therefore, the sound generated by the speakers 616 and 620 is guided inside the housing by the enclosure structure 618 to exit the housing 608 from its front, rear, left and right sides.

The enclosure structure 618 of the rear speaker 616 includes an upper portion 618A and a base portion 618B. The rear speaker 616 is mounted in the base portion 618B, and the speaker opening of the rear speaker 616 is exposed on a rear surface of the base portion 618B. The upper and base portions 618A and 618B jointly provides a sealed enclosure for a rear portion of the rear speaker 616. The upper portion 618A is electrically conductive. One or more electronic components 632 are coupled to the upper portion 618A, such that the upper portion 618A at least partially provides electromagnetic shielding for the one or more electronic components while forming part of the sealed enclosure of the rear speaker 616. In some implementations, the one or more electronic components 632 is also thermally coupled to the upper portion 618A which acts as a heat sink to absorb heat generated by the one or more electronic components and dissipate the generated heat away from the electronic components 632. In some implementations, the one or more electronic components 632 are mounted on a rear surface of the main logic board 622. A conductive plane disposed in a substrate of the main logic board 622 is grounded to provide electromagnetic shielding for the electronic components 632 jointly with the upper portion 618A. More details on a multi-function speaker enclosure 618 are described with reference to FIG. 10 of this application and International Patent Application No. PCT/US2019/28959, filed Apr. 24, 2019, titled "Multipurpose Speaker Enclosure in a Display Assistant Device," which is hereby incorporated by reference in its entirety.

In some implementations, the housing 608 is covered by a fabric, and the plurality of speaker grill portions 614 are concealed behind the fabric. Stated another way, the plurality of speaker grill portions 614 are not visible to a user of the display assistant device 500 from an exterior look. Optionally, the fabric is secured to the housing 608 by a thermally activated adhesive that is applied in selective areas as to prevent the fabric from moving during speaker operation and also not occlude sound output. In some implementations, the fabric may be tensioned over the housing and held in place by mechanical clamping. The fabric is cut open at the power adapter interface 518, and wrapped around a circular edge of the power adapter interface 518.

In some implementations, the base 502 further includes a power board that is also contained within the housing 608. In some embodiments, the power board is embedded in a rear portion of the enclosure structure 618 and aligned with the power adapter interface 518, when the enclosure structure 618 is assembled into the base 502. The power board is electrically coupled to the power adaptor interface 518 exposed on the rear side 502B of the base 502 to access an external power source, while it is also electrically coupled to a main logic board 622 of the display assistant device 500 via a flexible printed circuit board (PCB) or interconnect cable (e.g., 1202 in FIG. 12). By these means, the power board is configured to drive the main logic board 622 of the display assistant device 500 with the external power source.

The front side 502A of the housing 608 is shorter than the rear side 502B of the housing 608, e.g., a height of the front side 502A is only 20% of that of the rear side 502B, such that the housing 608 has a tilted opening 624 on its top. The tilted opening 624 is mechanically coupled to the rear surface 506 of the screen 504. The back cover 606 has a back opening 626, and the tilted opening 624 of the base 502 is aligned with the back opening 626 of the back cover 606, thereby allowing interconnects to connect electronic components (e.g., a display module) mounted in the screen 504 to the main logic board 622. When the screen 504 and the base 502 are mechanically coupled, a central portion of the rear surface 506 of the screen 504 is covered by the base 502. Optionally, the central portion of the rear surface 506 covered by the base 502 accounts for 50-70% of an entire area of the rear surface 506. In some implementations, to assemble the back cover 606 to the base 502, each edge of the back opening 626 of the back cover 606 is fastened to an interior surface of the housing 608 via one or more fasteners (e.g., screws). For example, top and bottom edges of the back opening 626 of the back cover 606 are fastened to interior rear and front surfaces of the housing 608, respectively.

The base mount plate 612 is made of flexible material, and is mechanically coupled to a body of the base 502 (e.g., a bottom portion of the speaker assembly 610) via at least an edge of the base mount plate 612 (e.g., a peripheral edge surrounding the base mount plate 612). In some implementations, the edge of the base mount plate 612 included a raised portion configured to wrap around the edge of the body of the base 502 to which the base mount plate 612 is attached. The edge of the body of the base 502 optionally has a holding structure to couple to the raised portion the base mount plate 612, thereby facilitating the edge of the base mount plate 612 to hold onto the body of the base 502. In some implementations, the base mount plate 612 is made of an anti-slip material (e.g., silicone) and has a bottom surface that has a predefined friction coefficient with the surface on which the display assistant device 500 is configured to sit. The predefined friction coefficient is greater than a threshold friction coefficient such that the base 502 can sit on the surface tightly. Optionally, the bottom surface of the base mount plate 612 has a substantially concave shape that recesses slightly towards the body of the base 502.

Figure 7A:
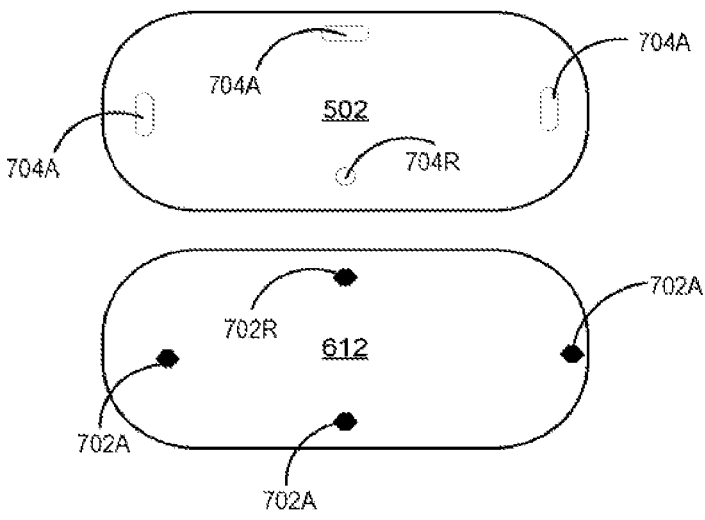
FIG. 7A illustrate a top surface of a base mount plate and a bottom surface of a body of the base that match each other in accordance with some implementations.

Further, in some implementations, the base mount plate 612 further includes a top surface opposing the bottom surface. FIG. 7A illustrate a top surface of a base mount plate 612 and a bottom surface of a body of the base 502 that match each other in accordance with some implementations. The top surface of the base mount plate 612 includes a plurality of stud fasteners 702 configured to mate with a plurality of receiving fasteners 704 on the bottom surface of the body of the base 502 (e.g., a bottom surface of the enclosure structure 618). The plurality of receiving fasteners 704 includes at least a reference receiving fastener 704R. A reference stud fastener 702R has a shape that is substantially complementary to a shape of the reference receiving fastener 704R except that a dimension of the reference stud fastener 702R is slightly bigger than a dimension of the reference receiving fastener 704R, such that the reference stud fastener 702R can be fit into the corresponding reference receiving fastener 704R substantially tightly, i.e., be squeezed into the reference receiving fastener 704R. Optionally, the plurality of receiving fasteners 704 includes one or more adjustable receiving fasteners 704A in addition to the reference receiving fastener 704R. For example, each adjustable receiving fastener 704A includes a groove fastener having an extended length. a corresponding stud fastener 702A has a width slightly greater than that of the groove fastener but a length substantially smaller than that of the groove fastener, such that the corresponding stud fastener 702A can be fit into the groove structure tightly at the width of the groove fastener while sliding along the extended width of the groove fastener. In some implementations, all of the plurality of stud fasteners 702 are identical, and the reference receiving fastener 704R has a shape that is distinct from shapes of the one or more adjustable receiving fasteners 704A.

Specifically, in an example, the base mount plate 612 has an elliptical or oblong shape having a long axis and a short axis. Four stud fasteners 702 are disposed adjacent to the edge of the base mount plate 612. Two of the stud fasteners 702 are placed on the long axis and two of the stud fasteners 702 are placed on the short axis. Each of the stud fasteners 702 has a hexagonal shape. One of four corresponding receiving fasteners 704R is a circular hole at the bottom surface of the body of the base 502, and the circular hole is slightly smaller than the hexagonal shape of the stud fastener 702 to allow the stud fastener 702 to squeeze into the circular hole tightly. Each of the other three corresponding receiving fasteners 704A includes a groove fastener located at the bottom surface of the body of the base 502, and the groove fastener is slightly narrower than the hexagonal shape of the stud fasteners 702 to allow the stud fasteners to squeeze into the groove fasteners tightly while being able to move in a groove.

It is also noted that positions of the stud fasteners 702 and the receiving fasteners 704 can be swapped in some implementations, i.e., the top surface of the base mount plate 612 includes a plurality of receiving fasteners 704 configured to mate with a plurality of stud fasteners 702 on the bottom surface of the body of the base 502. Alternatively, in some implementations, the base mount plate 612 is coupled to the body of the base 502 using an adhesive.

Figure 7B:
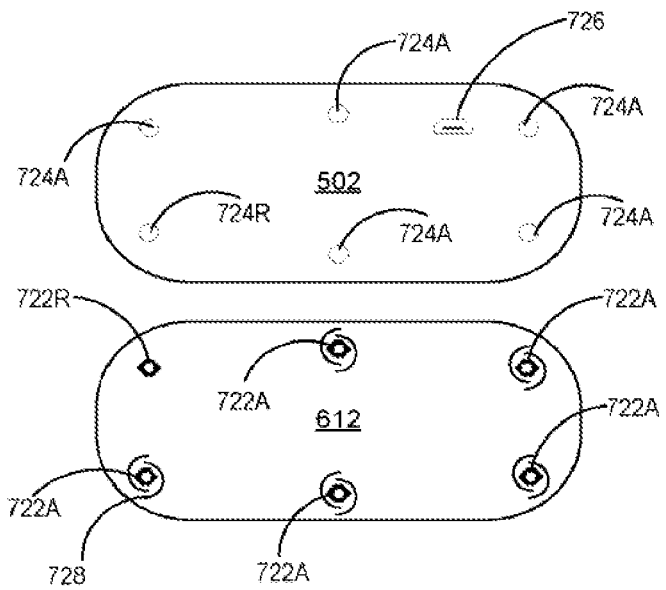
FIG. 7B illustrate another top surface of a base mount plate and another bottom surface of a body of the base that match each other in accordance with some implementations.

FIG. 7B illustrate another top surface of a base mount plate 612 and another bottom surface of a body of the base 502 that match each other in accordance with some implementations. The top surface of the base mount plate 612 includes a plurality of stud fasteners 722 configured to mate with a plurality of receiving fasteners 724 on the bottom surface of the body of the base 502 (e.g., a bottom surface of the enclosure structure 618). In an example, six stud fasteners 722 are disposed adjacent to the edge of the base mount plate 612. A pair of the stud fasteners 722 is placed on each of a first end, a middle section and a second end of the long axis. Each of the stud fasteners 722 has a hexagonal shape, optionally with a hollow center, and each of the receiving fastener 724 includes a circular hole at the bottom surface of the body of the base 502. The circular hole is configured to receive a corresponding stud fastener 724, and a dimension of the circular hole is slightly smaller than a dimension of the hexagonal shape of the stud fastener 722 to allow the stud fastener 722 to fit into the circular hole tightly (i.e., squeeze into the circular hole).

The plurality of stud fasteners 722 includes a reference stud fastener 722R. A reference receiving fastener 724R has a shape that is substantially complementary to a shape of the reference stud fastener 722R except that a dimension of the reference stud fastener 722R is slightly bigger than a dimension of the reference receiving fastener 724R, such that the reference stud fastener 722R can be fit into the corresponding reference receiving fastener 724R substantially tightly. Optionally, the plurality of stud fasteners 722 includes one or more adjustable stud fasteners 722A in addition to the reference stud fastener 722R. A receiving fastener 724A has a shape that is substantially complementary to a shape of each adjustable stud fastener 722A, and the adjustable respective stud fastener 722A is configured to be fit into the corresponding receiving fastener 724A substantially tightly. In some implementations, all of the plurality of receiving fasteners 724 are identical, and an example shape of the receiving fasteners 724 is circular or oblong. Each stud fasteners 722 includes a hexagonal protrusion. Each adjustable stud fastener 722A has two more semicircular cutouts than the reference stud fasteners 722R. The two semicircular cutout 728 are recessed on the top surface of the base mount plate 612 and surround the hexagonal protrusion. The two semicircular cutout are configured to facilitate a minor twist and/or shift (e.g., a twist of 5 degrees, a shift of 0.2-0.3 mm) of the respective adjustable stud fastener 722R during the course of fitting the respective adjustable stud fastener 722A tightly into a corresponding receiving fastener 724A.

Each of the stud fasteners (702 and 722) and receiving fasteners (704 and 724) is made of a respective compliant material, such that both fasteners in a pair of mating stud fastener and receiving fasteners can be deformed to fit to each other tightly. In some implementations, a stud fastener 722 is not solid, i.e., is hollow (FIG. 7B), allowing the stud fastener 722 to be more easily deformed to fit into its corresponding receiving fastener 724.

It is also noted that positions of the stud fasteners 722 and the receiving fasteners 724 can be swapped in some implementations, i.e., the top surface of the base mount plate 612 includes a plurality of receiving fasteners 7204 configured to mate with a plurality of stud fasteners 722 on the bottom surface of the body of the base 502. In summary, the plurality of stud fasteners 702 or 722 includes a first stud 702R or 722R configured to match a first receiving fastener 704R or 724R with a first tolerance and a second stud 702A or 722A configured to match a second receiving fastener 704A or 724A with a second tolerance. The first tolerance is smaller than a threshold tolerance and the second tolerance being larger than the firs tolerance. That said, when the base mount plate 612 is being assembled onto the body of the base 502, the first stud 702R or 722R is snapped onto the first receiving fastener 704R or 724R before the second stud 702A or 722A is snapped onto the second receiving fastener 704A or 724A with adjustment of its position within the second tolerance.

Referring to FIG. 7B, in some implementations, the bottom surface of the body of the base 502 includes a data port 726 (e.g., a micro universal serial bus (micro USB) connector) configured to exchange data with an external computing device via a cable plugged onto the data port 726. The data port 726 is accessible when the base mount plate 612 is detached from the base 502. In many situations, the data port 726 is used internally by engineers for loading a program into the display assistant device 500, conducting diagnosis on any malfunctions, monitoring performance of the device 500, and the like.

Referring to FIGS. 6A and 6B, the display assistant device 500 includes a plurality of microphones 342 (e.g., four microphones). For example, two first microphones 342A are placed behind two microphone holes 512 opened on the cover glass 902 and configured to collect a first audio signal from the ambient of the display assistant device 500. Further, in some implementations, a second microphone 342B is disposed inside the housing 608 and in proximity to the front side 502A of the base 502, e.g., between the two front speakers 620. The second microphone 342B is configured to collect a second audio signal that entered the housing 608 via the speaker grill portions on the front side 502A of the base 502. In some implementations, a third microphone 342C is disposed inside the housing 608 and in proximity to the rear side 502B of the base 502, e.g., adjacent to the power adaptor interface 518. The third microphone 342C is configured to collect a third audio signal that entered housing 608 via the speaker grill portions on the rear side 502B of the base 502.

In some implementations, the first audio signal is used to detect human voices including one or more predefined hot words, while the second and/or third microphones 342 enable one or more adaptive sound features (e.g., including monitoring background sound in the ambient to be used for sound equalization). For example, the second and third audio signals collected by the second and third microphones 342 are used to automatically equalize sound projected by the front and rear speakers 620 and 616 of the display assistant device 500. Specifically, the second and third microphones 342 are covered by the fabric that wraps around the housing 608 of the base 502, and are invisible to a user. The second and third audio signals collected from the second and third microphones 342 are used to determine ambient noise and a phase difference between themselves. The phase difference may be used to identify an equalization setting that matches the environment where the display assistant device 500 is located. Optionally, the equalization setting of the front or rear speaker is determined using the determined ambient noise and phase difference based on a lookup table or machine learning.

Figure 8A:
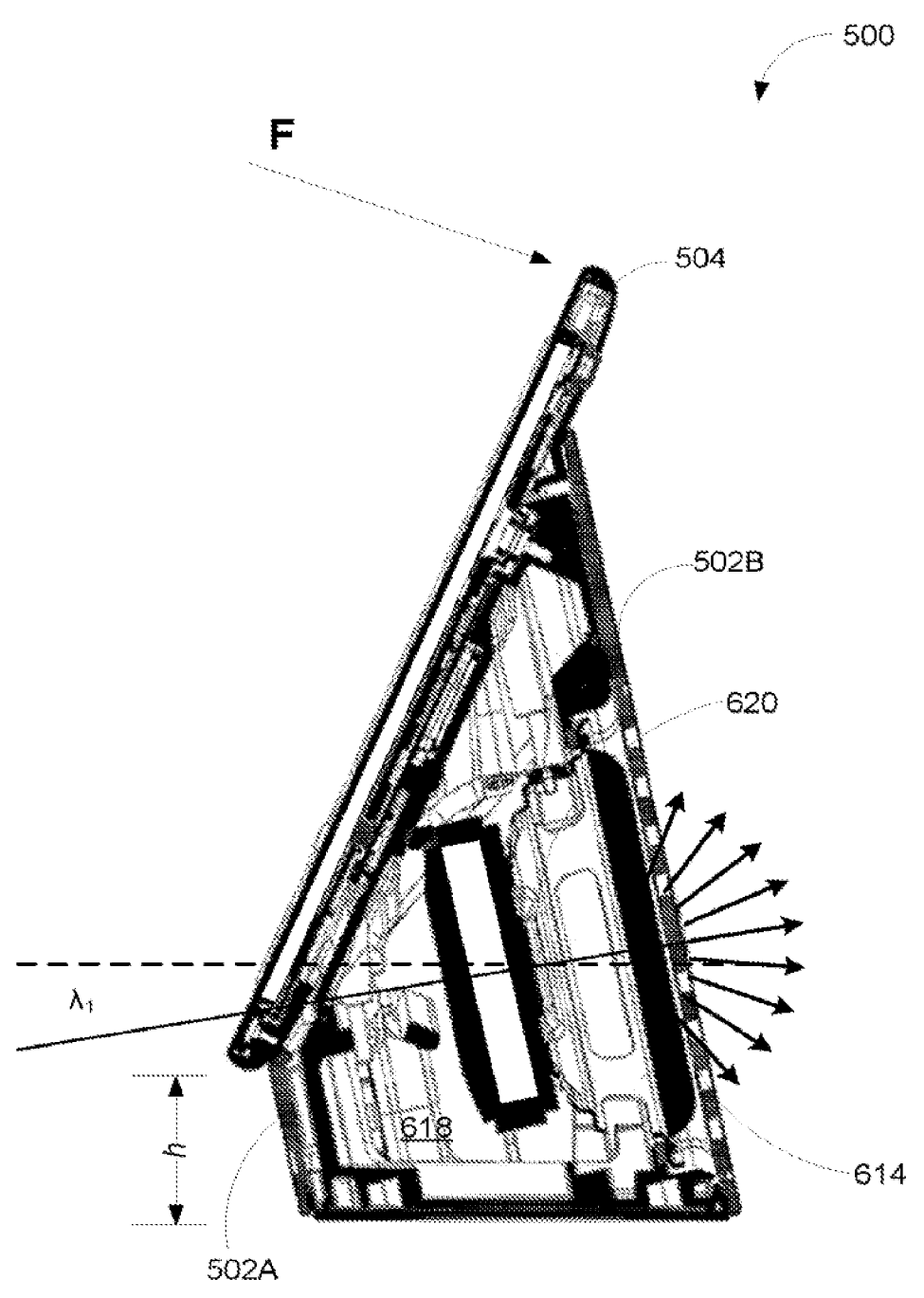
FIGS. 8A and 8B are two cross sectional views of a display assistant device taken at a rear speaker and at a front speaker in accordance with some implementations, respectively.
Figure 8B:
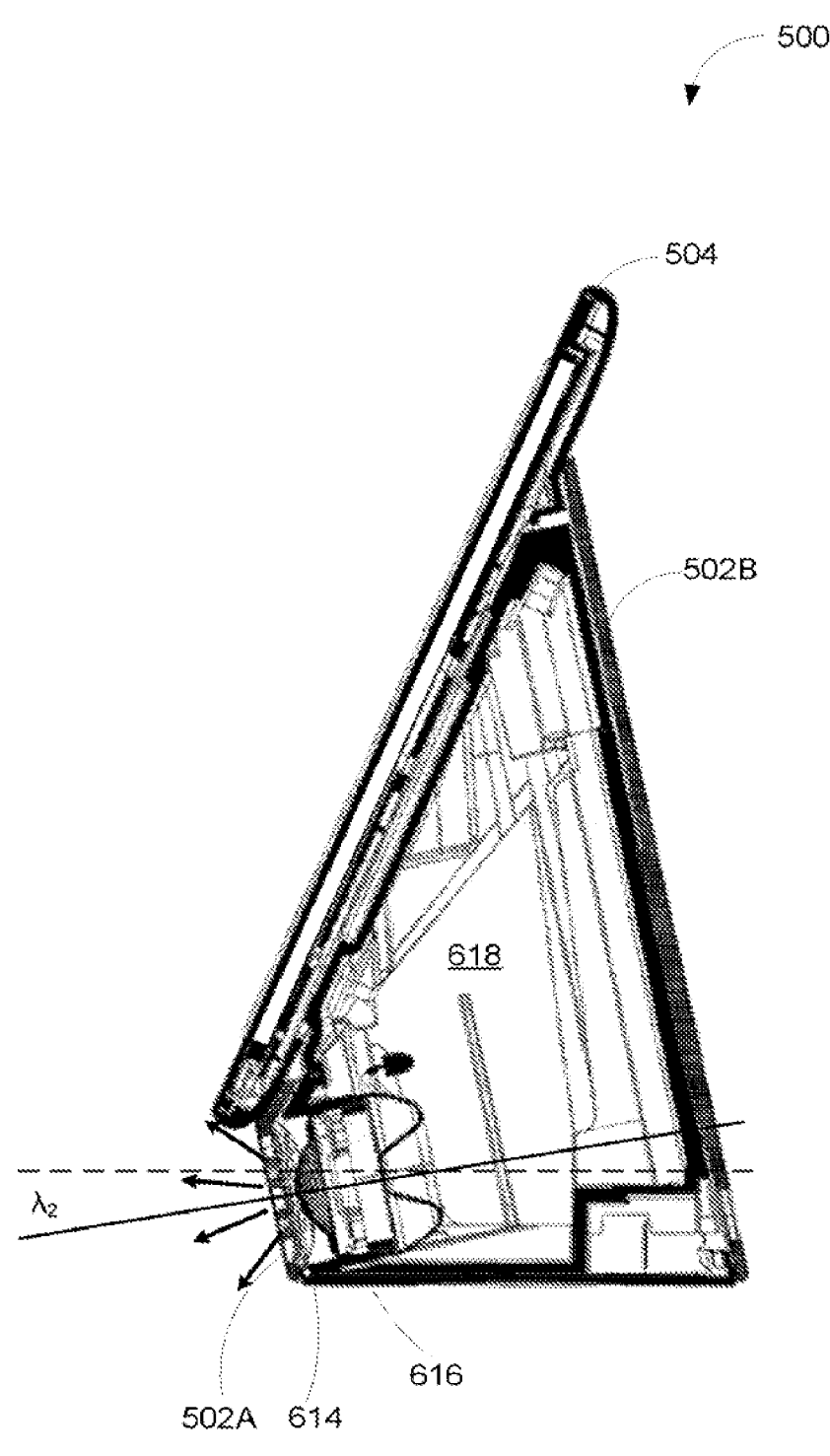

FIGS. 8A and 8B are two cross sectional views of a display assistant device 500 taken at a rear speaker 616 and at a front speaker 620 in accordance with some implementations, respectively. The display assistant device 500 includes a speaker assembly 610, and the speaker assembly 610 further includes a rear speaker 616 and one or more front speakers 620. The enclosure structure 618 provides a sealed structure for a rear portion of the rear speaker 616 while a speaker opening of the rear speaker 616 is exposed from a rear surface of the enclosure structure 618. Stated another way, the enclosure structure 618 directly prevents sound waves projected into the rear portion of the rear speaker 616 by a diaphragm of an open speaker driver of the rear speaker 616 from interacting with (i.e., interfering with) sound waves projected towards the speaker opening of the rear speaker 616. The speaker opening of the rear speaker 616 faces backward and is optionally tilted upward with a tilting angle $A_1$.

The enclosure structure 618 optionally provides a sealed structure for a rear portion of each front speaker 620 while a speaker opening of the respective front speaker 620 is exposed from a front surface of the enclosure structure 618. That said, part of the enclosure structure 618 directly prevents sound waves projected into the rear portion of the front speaker 620 by a diaphragm of an open speaker driver of the front speaker 620 from interacting with (i.e., interfering with) sound waves projected towards the speaker opening of the front speaker 620.

Alternatively, in some implementations, each front speaker 620 may not rely on the enclosure structure 618 to provide the sealed structure. Rather, the front speaker 620 is individually packaged and mechanically integrated into the enclosure structure 618, and the enclosure structure 618 provides mechanical support to the front speaker 620 without controlling the sound waves projected by the front speaker 620. In some implementations, a speaker opening of each front speaker 620 has a dimension substantially greater than or matches a predefined height h of the space separating a bottom edge of the screen 504 and the surface on which the display assistant device 500 is configured to sit. The speaker opening of each front speaker 620 faces forward and is optionally tilted downward with a tilting angle A2. In some implementations, the tilting angles $A_1$ and A2 are equal. Further, in some implementations, the tilting angles $A_1$ and A2 are equal to the base angle a and the screen angle $\beta$ (which, for example, are equal to 15 degrees).

The rear speaker 616 is oriented to face the rear side of the base, and configured to project sound substantially towards a rear view of the display assistant device 500, i.e., project a substantial portion of sound generated by the rear speaker 616 out of the base 502 via its rear side 502B. In contrast, each front speaker 620 (if any) is oriented to face the front side of the base, and configured to project sound substantially towards a front view of the display assistant device 500, i.e., project a substantial portion of sound generated by the respective speaker 620 towards the space between the bottom edge of the screen 504 and the surface. A housing 608 of the base 502 includes a plurality of speaker grill portions disposed on one or more of a front side 502A, a rear side 502B, a left side and a right side of the base 502. In some implementations, a substantial portion (e.g., 80% or more) of the sound generated by the front speaker 620 or rear speaker 616 exits the base 502 via speaker grill portions on the front side 502A or rear side 502B of the base 502, respectively. Remaining portions of the sound generated by the front/rear speaker are guided inside the housing 608 to exit the base 502 via a subset of speaker grill portions that are disposed on one or more of the rear/front side, left side and right side of the base 502.

The speaker assembly 610 is disposed in a lower portion of a base 502 to lower down a center of mass of the entire display assistant device 500 which, for example, is lower than a predetermined portion (e.g., one third) of a height of the display assistant device 500. In some implementations, for the purposes of lowering down the center of mass, a speaker assembly 610 having a larger weight is selected over a speaker assembly having a smaller weight when their costs or speaker box volumes are comparable. For example, a rear speaker 616 has a volume of 120 cc, and a Ferrite based speaker is selected over a Neodymium based speaker because of its weight advantage. Given its center of mass and weight, the display assistant device 500 does not tip over (forward or backward) easily when a blunt force F hits a top edge of the display assistant device 500 or a user touch occurs to the screen 504 of the display assistant device 500. For example, the center of mass is configured so that the display assistant device 500 can sustain an impact force of 50 Newton without tipping over.

In some implementations not shown in FIGS. 8A and 8B, the enclosure structure 618 includes two shoulders each of which is recessed and separated from the housing 608 by a respective sound space, and the sound projected from the rear speaker 616 is configured to be guided through the sound spaces to exit the base 502 from one or both of the speaker grill portions located on the left and right sides of the housing 608 (not shown in FIGS. 8A and 8B). In some implementations, the two shoulders of the enclosure structure 618 have different shapes, e.g., have a hyperbolic shape and a parabolic shape, respectively. In some implementations, the sound spaces are created to eliminate air disturbance associated with the sound that exits the base 502 via the rear side of the housing 608 and thereby reduce noise in the sound broadcasted from the rear speaker 616. Likewise, sound spaces can be created to guide the sound projected from the front speaker 620 to the right and/or left sides of the housing 608. More details on the speaker assembly 610 of the display assistant device 500 are discussed with reference to PCT Patent Application No. PCT/US18/64536, filed Dec. 7, 2018, titled "Speaker Assembly of a Display Assistant Device," which claims priority to U.S. Provisional Patent Application No. 62/743,464, filed Oct. 9, 2018, titled "Speaker Assembly of a Display Assistant Device," each of which is hereby incorporated by reference in its entirety.

Figures 9A, 9B:
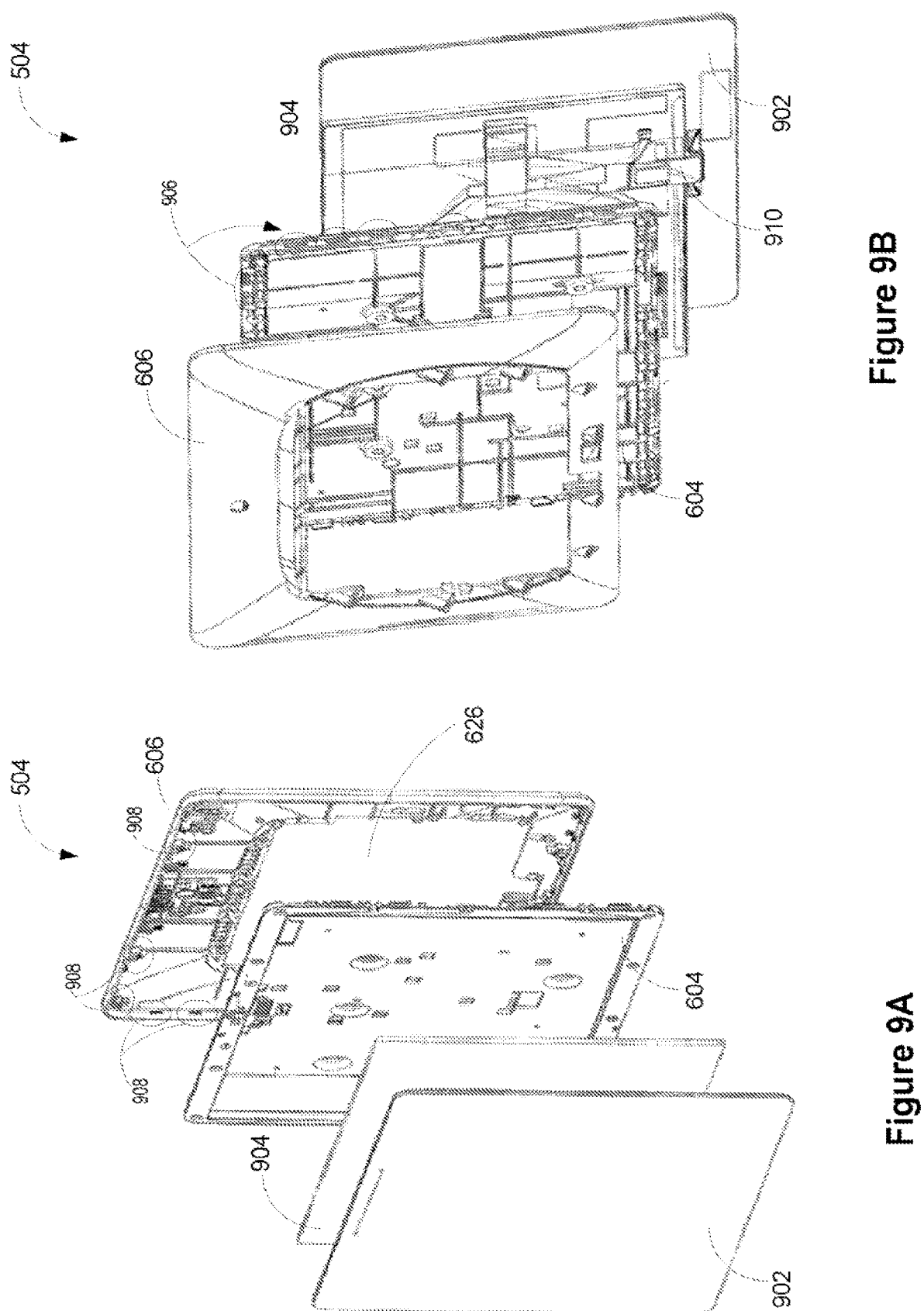
FIGS. 9A and 9B are two exploded views of a screen of a display assistant device from a front perspective angle and a rear perspective angle in accordance with some implementations, respectively.

FIGS. 9A and 9B are two exploded views of a screen 504 of a display assistant device 500 from a front perspective angle and a rear perspective angle in accordance with some implementations, respectively. The screen 504 includes a cover glass 902, a display panel 904, a middle frame 604 and a back cover 606 of a display assistant device 500 in accordance with some implementations. In some implementations, the cover glass 902 and the display panel 904 are integrated in a display front 602, which is optionally obtained as an off-the-shelf module. Edge areas of a rear surface of the cover glass 902 are covered with paint to define a bezel area surrounding an active display area of the screen 504. In some implementations, the bezel area includes a subset of one or more microphone holes 512, an indicator window 514, a camera window 520 and a sensor window 516. A microphone 342, indicator 356 or camera module 350 may be disposed between the display panel 904 and the middle frame 604, and specially, behind each of the microphone hole 512, indicator window 514 and camera window 520, respectively. Optionally, the display panel 904 has a rear surface made of thermally and electrically conductive material (e.g., a metal plate). When a thermal spreader is attached to a portion of the rear surface of the display panel 904, it redistributes heat evenly across itself and the portion of the rear surface of the display panel 904, thereby avoiding formation of hot spots on the display panel 904.

Specifically, in some implementations, one or more microphones 342 are placed behind the microphone holes 512 and configured to collect sound from the ambient of the display assistant device 500. In some implementations, the display assistant device 500 further includes a sensor window 516 configured to access an ambient light sensor 370 (e.g., a white ambient light sensor, an RGB color sensor).

The ambient light sensor 370 is disposed behind the bezel area and exposed to light via transparent part of the bezel area, e.g., the sensor window 516. The ambient light sensor 370 is configured to detect a light condition in the smart home environment 100 where the display assistant device 500 is located. In some situations, the display assistant device 500 is configure to adjust a brightness level and/or a color tone of its screen 504 according to the light condition. In some implementations, an indicator 356 is disposed behind the indicator window 514, and configured to provide a sequential lighting pattern to indicate whether the display assistant device 500 is active or inactive, whether the display assistant device 500 is mute or not, and/or a voice processing state (e.g., hot word detection, listening, thinking and speaking). The sequential lighting pattern of the indicator is defined by illumination specifications, e.g., one or more of an LED illumination duration, pulse rate, duty cycle, color sequence and brightness. In some implementations, a camera module 350 is disposed behind the camera window 520 to capture a video stream of its field of view.

The middle frame 604 is disposed between the display front 602 and the back cover 606. In some implementations, the middle frame 604 is mechanically coupled to the display front 602 using an adhesive that is applied adjacent to edges of the display front 602 and middle frame 604. The middle frame 604 has a plurality of first retention elements 906, and each first retention element is formed on a rear surface of the middle frame 604 and adjacent to an edge of the middle frame 604. The back cover 606 has a plurality of second retention elements 908 that are complementary to and configured to be mated to the plurality of first retention elements 906. When the middle frame 604 (which has been integrated with the display front 602) and the back cover 606 are aligned and assembled to each other, the plurality of first and second retention elements 906 and 908 are mated to each other. In some implementations, the first and second retention elements 906 and 908, when mated, are configured to control an in-plane displacement of edges of the back cover 606 in response to an impact of a force on the edges of the back cover 606, thereby limiting an out-of-place displacement of each edge of the back cover 606 and protecting edges of the display front 602 from falling apart from the edges of the back cover 606. More details on drop protection features of the display assistant device 500 (e.g., the first and second retention elements 906 and 908) are discussed with reference to PCT Patent Application No. PCT/US2018/64452, filed Dec. 7, 2018, titled "Drop Protection for a Display Assistant Device," which claims priority to U.S. Provisional Patent Application No. 62/742,888, filed Oct. 8, 2018, titled "Drop Protection for a Display Assistant Device," which is hereby incorporated by reference in its entirety.

Referring to FIG. 9A, the display panel 904 of the display front 602 is coupled to a display module 910 that is configured to provide backlight sources and drive individual display pixels of the display panel 904. Optionally, the display module 910 is disposed adjacent to an edge of the display panel 904. The display module 910 protrudes from the rear surface of the display panel 904. In some implementations, the display module 910 is attached to the middle frame 604 disposed next to the display panel 904.

In some implementations, the middle frame 604 is substantially made of polymeric material (e.g., glass-reinforced polycarbonate). For example, a predetermined amount (e.g., 30%) of glass fibers is added to polycarbonate to increase tensile strength, stiffness and compressive strength, and reduce the thermal expansion coefficient of the middle frame 604.

Figure 10A:
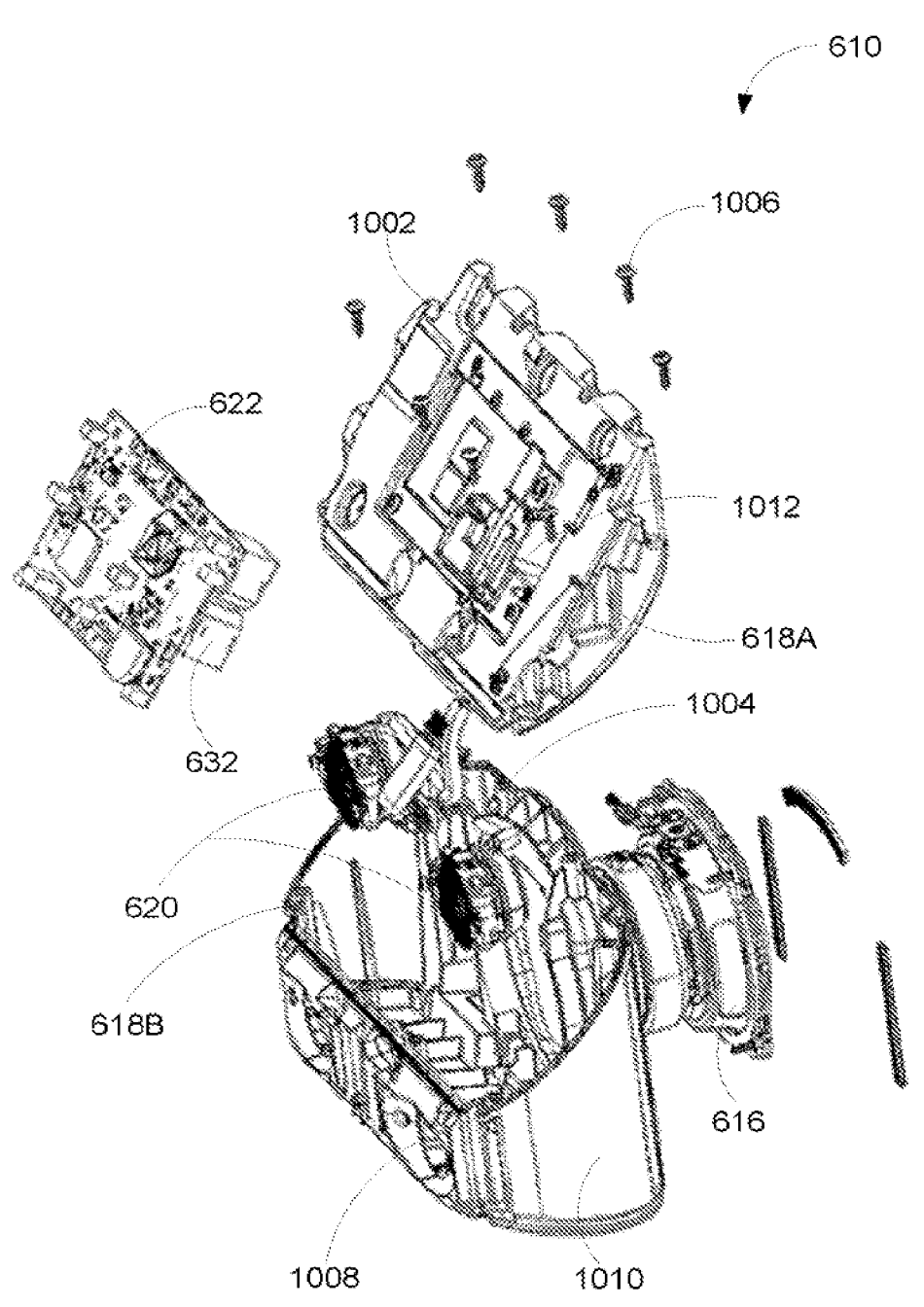
FIGS. 10A and 10B are two exploded views of a speaker assembly of a display assistant device from a front perspective angle and a rear perspective angle in accordance with some implementations, respectively.
Figure 10B:
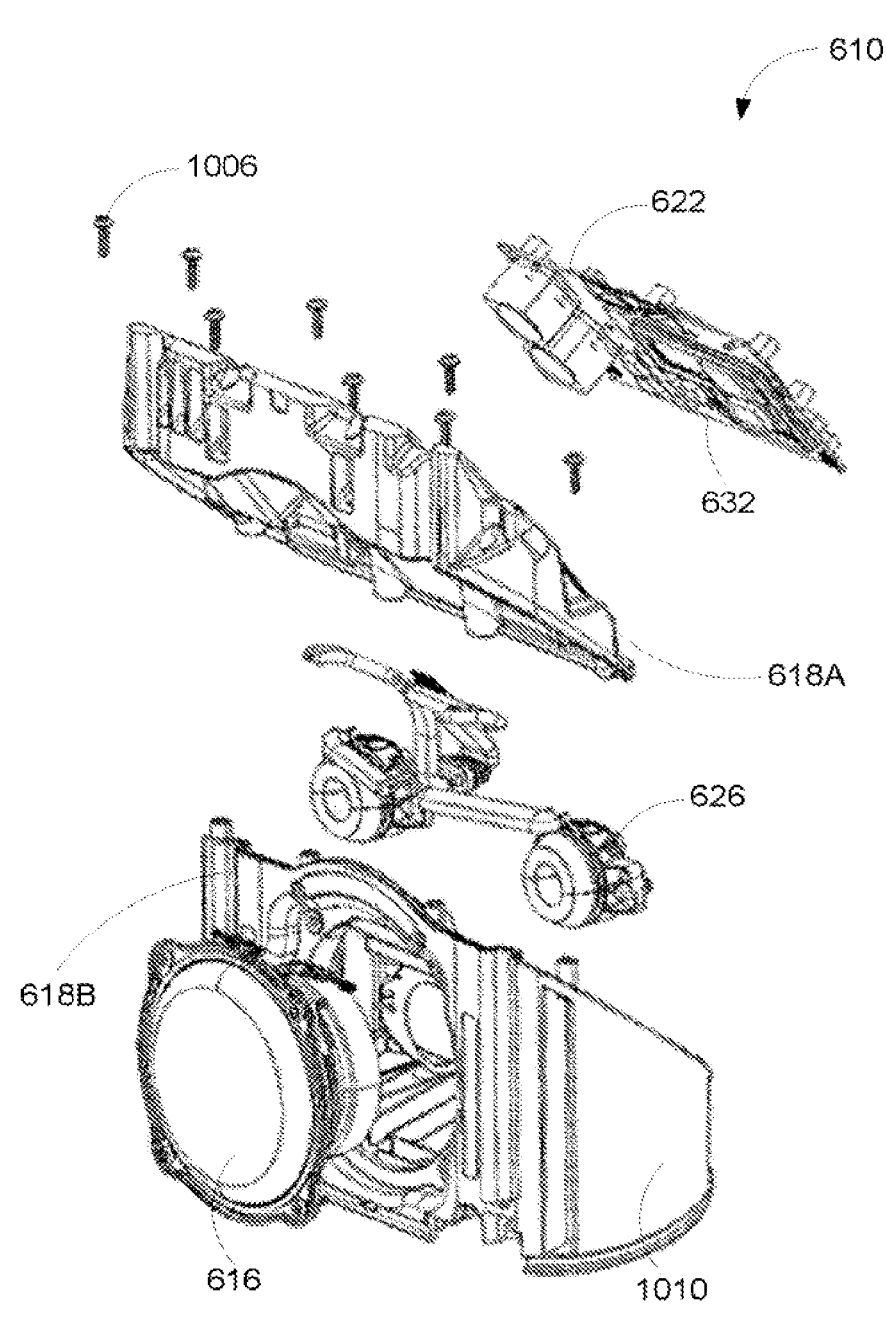

FIGS. 10A and 10B are two exploded views of a speaker assembly 610 of a display assistant device 500 from a front perspective angle and a rear perspective angle in accordance with some implementations, respectively. The speaker assembly 610 includes a rear speaker 616, two front speakers 620 and an enclosure structure 618 of the rear speaker 616. The enclosure structure 618 further includes an upper portion 618A and a base portion 618B. The base portion 618B is configured to hold the front and rear speakers. The upper and base portions 618A and 618B includes a first plurality of fastener structures 1002 and a second plurality of fastener structures 1004 that are complementary to each other. The upper portion 618A is mechanically coupled to the base portion 618B via the fastener structures 1002 and 1004 (e.g., coupled to each other via fasteners 1006), thereby forming a sealed enclosure for the rear speaker 616. Specifically, an open speaker driver of the rear speaker 616 is mounted on a rear surface of the enclosure structure 618, and a speaker opening of the rear speaker 616 faces backward to a rear view of the display assistant device 500. The enclosure structure 618 directly prevents sound waves projected into a rear portion of the rear speaker 616 by a diaphragm of the open speaker driver of the rear speaker 616 from interacting with (i.e., interfering with) sound waves projected towards the speaker opening of the rear speaker 616. In some implementations, the upper portion 618A has an internal surface that is configured to control the sound waves projected into the rear portion of the rear speaker 616 directly. In some implementations (not shown in FIG. 10A and 10B), the base portion 618B includes a sealed enclosure by itself when the open speaker driver of the rear speaker 616 is mounted on its rear surface, and the upper portion 618A is attached to the base portion 618B without controlling the sound waves projected into the rear portion of the rear speaker 616.

The one or more front speakers 620 face a front view that is opposite to the rear view that the rear speaker faces. In some implementations, each front speakers 620 is not individually packaged and relies on the base portion 618B to provide a front enclosure 1008. The front enclosure 1008 is separated from the sealed enclosure that controls the sound waves generated by the rear speaker 616. An open speaker driver of the respective front speaker 620 is disposed in the front enclosure 1008 to seal the front enclosure 1008. The front enclosure 1008 is configured to constrain sound waves projected backward by a diaphragm of the open speaker driver of the respective front speaker 620 within the front enclosure 1008 and thereby separate it from sound waves projected forward by the diaphragm. That said, the enclosure structure 618 includes a plurality of separated sealed spaces each of which provides a respective sealed enclosure for one of the front and rear speakers 620 and 616.

Alternatively, in some implementations, each front speakers 620 is individually packaged and integrated into the base portion 618B of the enclosure structure 618, i.e., has its own sealed enclosure for separating the sound waves projected forward from sound waves projected backward by the diaphragm of the open speaker driver of the respective front speaker 620. In some situations, the base portion 618B has a front enclosure 1008 for each front speaker 620. The front enclosure 1008 is separated from the sealed enclosure for controlling the sound waves generated by the rear speaker 616. The front enclosure 1008 is configured to receive the respective front speaker 620, allowing the respective front speaker 620 to face forward when disposed in the front enclosure 1008. Alternatively, in some situations, the base portion 618B has a front opening 1008 for each front speaker 620. The front opening 1008 is connected to the sealed enclosure for controlling the sound waves generated by the rear speaker 616. The front opening 1008 is sealed when the respective front speaker 620 that is individually packaged is disposed therein.

In some implementations, a side wall 1010 of the enclosure structure 618 comes into contact with an interior surface of a housing 608 when the enclosure structure 618 is assembled into the housing 608. Alternative, in some implementations, a sound space is created between the side wall 1010 of the enclosure structure 618 and the interior surface of the housing 608 to modulate sound projected from the corresponding front speaker 620 or rear speaker 616. The sound space may be separated to two sound spaces to modulate the sound projected from the corresponding front speaker 620 and rear speaker 616 separately. In an example, the side wall 1010 of the enclosure structure 618 has one of a hyperbolic shape and a parabolic shape. It is noted that the side walls 1010 on two different sides (also called shoulders) of the enclosure structure 618 may have the same shape or distinct shapes.

The upper portion 618A is configured to support a main logic board 622 of the display assistant device 500. A plurality of electronic components 632 are mounted on both sides of the main logic board 622. The upper portion 618A includes a recess 1012 configured to receive one or more of the electronic components 632 that are mounted on and rises from a rear surface of the main logic board 622. In accordance with some implementations of the application, the upper portions 618A is made of an electrically conductive material, and at least partially provides electromagnetic shielding for a subset of the electronic components 632 while forming part of the sealed enclosure of the rear speaker 616. In some implementations, the subset of the electronic components 632 is also thermally coupled to the upper portion 618A which acts as a heat sink to absorb heat generated by the one or more electronic components and dissipate the generated heat away from the electronic components 632. By these means, the upper portion 618A can serves dual or triple purposes (i.e., acts as two or more of a sealed enclosure of the rear speaker, an electromagnetic shield and a heat sink) in the display assistant device 500. More details on electromagnetic shielding and heat dissipating functions of a multi-function speaker enclosure 618 are described below.

In accordance with some implementations of this application, the upper portion 618A is electrically and thermally conductive, and serves multiple functions including, but are not limited to, sealing the rear speaker 616, deterring electromagnetic interference and absorbing heat generated by the electronic components 632. An example material of the upper portion 618 of the enclosure structure 618 is metal. The bottom portion 618B does not need to be electrically and thermally conductive although it can be, so in some implementations, the bottom portion 618B is made of a non-metallic material (e.g., wood and synthetic fiber) to control an overall weight of the display assistant device 500. In some implementations, the upper portion 618 is a metallic hollow structure for the purposes of reducing cost and controlling the weight of the display assistant device 500. In some implementations, the upper portion 618 has a top surface made of an electrically and thermal conductive material configured to facilitate heat dissipation and electromagnetic shielding, while a body of the upper portion 618 is not electrically and thermally conductive.

FIG. 11 is a flow chart of an example assembly process 1100 of a display assistant device 500 in accordance with some implementations. A display front 602, a middle frame 604 and a base 502 are provided (1102) separately. Specifically, a cover glass 902 is coupled (1104A) to a display panel 904 to cover the display panel 904, and a display module 910 is optionally disposed (1104B) on a rear surface of the display panel 904. In some implementations, a thermal spreader is attached (1104C) to the rear surface of the display panel 904 to at least partially distribute heat on the rear surface of the display panel 904 and/or dissipate heat toward a front surface of the display assistant device 500. A speaker assembly 610 is formed (1106) by integrating a rear speaker 616 and one or more front speakers 620 onto a base portion 618B of an enclosure structure 618 of the rear speaker 616, fastening an upper portion 618A onto the base portion 618B, and coupling a main logic board 622 onto a top surface of the upper portion 618A of the enclosure structure 618. The speaker assembly 610 is disposed (1108A) in the housing 608 (optionally with a power board), and the housing 608 is covered (1108B) by a base mount plate 612, thereby forming a base 502 of the display assistant device 500.

Figure 12:
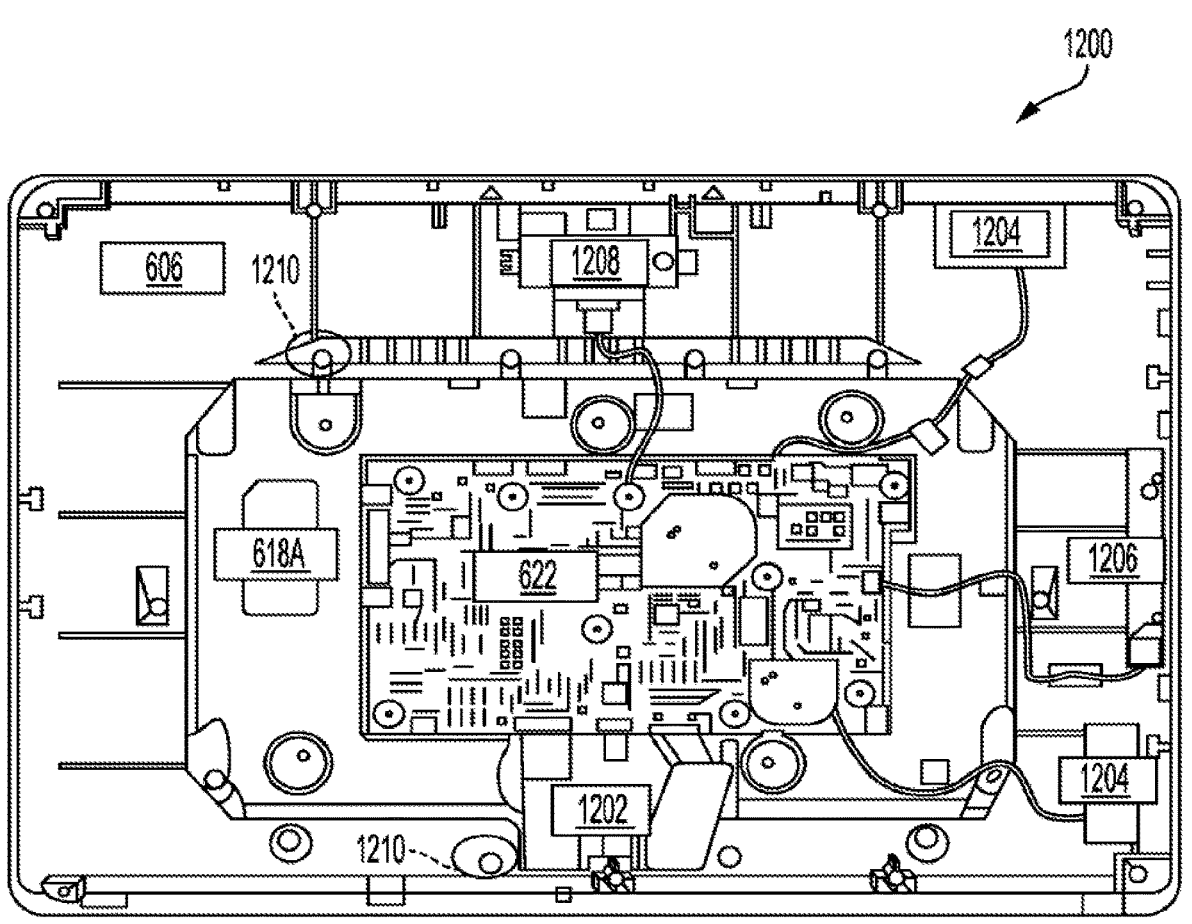
FIG. 12 is an intermediate assembly seen via a back opening of the back cover when the back cover is assembled onto the base in accordance with some implementation.

A back cover 606 is assembled (1110) to the base 502. The back over 606 has a back opening 626, and the main logic board 622 and the top surface of the speaker assembly 610 are exposed from the back opening 626 when the back cover is assembled onto the base 502. FIG. 12 is an intermediate assembly 1200 seen via a back opening 626 of the back cover 606 when the back cover 606 is assembled (1110) onto the base 502 in accordance with some implementation. Optionally, top and bottom edges of the back opening 626 of the back cover 606 are fastened to an interior rear surface and a front surface of the housing 608, respectively.

After the back cover 606 is assembled (1110) to the base 502, the middle frame 604 is coupled (1112) to the back cover 606 via a first plurality of fastener structures 1002 of the middle frame 604 and a second plurality of fastener structures 1004 of the back cover 606. The display front 602 is coupled (1114) to the middle frame 604 optionally via an adhesive that is applied adjacent to edges of the display front 602 and middle frame 604. Optionally, the display module is mounted on a front surface of the middle frame 604. It is noted that the order of the operations in the example assembly process 1100 of a display assistant device 500 can be varied.

Referring to FIG. 12, when the back cover 606 is assembled onto the base 502, a power cable 1202 is applied to couple a power board in the base 502 to the main logic board 622. A plurality of antenna boards 1204 (including antennas and corresponding transceiver circuit) are disposed on a front surface of the back cover 606 and in proximity to edges of the back cover 606 (i.e., away from the electrically conductive upper portion 618A of the enclosure structure 618 in the base 502). A volume control board 1206 and a privacy control board 1208 are disposed on the front surface of the back cover 606, e.g., behind or in proximity to the volume control 344 and the privacy control 346, respectively. Each of the plurality of antenna boards 1204, volume control board 1206 and privacy control board 1208 is electrically coupled to the main logic board 622 via a respective interconnect cable.

Each antenna board 1204 includes one or more antennas configured to enable the display assistant device 500 to wirelessly communicate with other electronic devices, such as a hub device 180, a smart device 120, a client device 104, another display assistant device 500 and/or a server system 140. In some implementations, the antennas are configured to operate concurrently using two distinct frequencies. In some implementations, the antennas are configured to operate concurrently using two distinct communication protocols. In some implementations, one or more of the antennas is configured for broadband communications (e.g., Wi-Fi) and/or point-to-point communications (e.g., Bluetooth). In some implementations, one or more of the antennas is configured for mesh networking communications (e.g., ZWave). In some implementations, a first antenna is configured for 2.4 GHz Wi-Fi communication and a second antenna is configured for 5 GHz Wi-Fi communication. In some implementations, a first antenna is configured for 2.4 GHz or 5 GHz Wi-Fi communication and a second antenna is configured for Thread-based communication. In some implementations, a first antenna is configured for 2.4 GHz Wi-Fi communication and point-to-point communication, a second antenna is configured for 5 GHz Wi-Fi communication and point-to-point communication, and a third antenna is configured for mesh networking communication. In some implementations, two or more of the antennas are configured to transmit and/or receive data concurrently with others of the antennas.

In some implementations, the antennas of the display assistant device 500 include at least one dual-band Inverted-F Antenna (IFA). In some implementations, the antennas are made by flexible printed circuit (FPC), laser direct structuring (LDS), stamping, or other state of art antenna manufacturing technology. In some implementations, the size of the antenna is about quarter-wavelength at 2.4 GHz. In some implementations, each antenna includes a radiating element, a feed line, and a ground stub. In some implementations, at least one of the antennas includes a second ground stub. The second ground stub is adapted to match the antenna to both 2.4 GHz and 5 GHz. In some implementations, the antenna feed is the feeding point for the 2.4 GHz and 5 GHz WiFi signal. In some implementations, the feed point is connected to the output of a WiFi chip. In some implementations, the antennas include two identical IFA antennas. Both antennas are attached to the rear surface of the middle frame 604 and covered by the back cover 606.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A display assistant device comprising:
a base configured for sitting on a surface, the base having a front side and a rear side that is taller than the front side, wherein the base extends upward along a central axis of the base that leans in a first direction by a first angle from perpendicular to a bottom surface of the base when the base sits on the surface;
a screen having a rear surface, wherein, when the screen is supported at the rear surface by the base, the screen leans in a second direction by a second angle from perpendicular to the bottom surface of the base when the base sits on the surface; and
a speaker that is concealed inside the base, wherein the speaker comprises a speaker opening that faces toward the front side or the rear side, wherein the speaker opening tilts at a third angle with respect to the bottom surface.

2. The display assistant device as recited in claim 1, wherein the screen faces substantially forward and leans backward by the second angle.

3. The display assistant device as recited in claim 1, wherein the first angle and the second angle have a same absolute value.

4. The display assistant device as recited in claim 1, wherein the speaker is a front speaker that tilts at a fourth angle with respect to the bottom surface.

5. The display assistant device as recited in claim 4, wherein the fourth angle and one or both of the first angle and the second angle have a same absolute value.

6. The display assistant device as recited in claim 4, further comprising a rear speaker that tilts at a fifth angle with respect to the bottom surface.

7. The display assistant device as recited in claim 6, wherein the rear speaker is configured to produce sound in a first frequency range, and the front speaker is configured to produce sound in a second frequency range.

8. The display assistant device as recited in claim 7, wherein the second frequency range is higher than the first frequency range.

9. The display assistant device as recited in claim 6, wherein the fifth angle and the fourth angle have a same absolute value.

10. The display assistant device as recited in claim 9, wherein the first angle and the second angle have the same absolute value.

11. The display assistant device as recited in claim 1, wherein the speaker is a rear speaker that tilts at a fourth angle with respect to the bottom surface.

12. The display assistant device as recited in claim 11, wherein the fourth angle and one or both of the first angle and the second angle have a same absolute value.

13. The display assistant device as recited in claim 1, wherein the central axis, the front side, and the rear side lean by the first angle from perpendicular to the bottom surface of the base when the base sits on the surface.

14. The display assistant device as recited in claim 1, wherein the base supports the screen such that a space exists between a bottom edge of the screen and a plane defined by the bottom surface.

15. The display assistant device as recited in claim 1, wherein the bottom surface has a base length and a base width that is less than the base length, the base width corresponding to a distance between the front side and the rear side.

16. The display assistant device as recited in claim 1, wherein the screen extends beyond an intersection of the screen and the base.

17. The display assistant device as recited in claim 1, wherein the screen has a front surface comprising a touch sensing area that is sensitive to touch events.

18. A method comprising:
configuring a base for sitting on a surface, the base having a front side and a rear side that is taller than the front side, wherein the base extends upward along a central axis of the base that leans in a first direction by a first angle from perpendicular to a bottom surface of the base when the base sits on the surface;
supporting a screen at a rear surface of the screen by the base so that the screen leans in a second direction by a second angle from perpendicular to the bottom surface of the base when the base sits on the surface; and
concealing a speaker inside the base, wherein the speaker comprises a speaker opening that faces toward the front side or the rear side and the speaker opening tilts at a third angle with respect to the bottom surface.

19. The method as recited in claim 18, wherein the first angle and the second angle have a same absolute value.

* * * * *